(12) United States Patent
Hong et al.

(10) Patent No.: US 10,428,429 B2
(45) Date of Patent: Oct. 1, 2019

(54) FORMULATION AND METHOD FOR INHIBITING CARBON-BASED DEPOSITS

(71) Applicant: AGENCY FOR SCIENCE, TECHNOLOGY AND RESEARCH, Singapore (SG)

(72) Inventors: Liang Hong, Singapore (SG); Yuanhuan Zheng, Singapore (SG); Siok Wei Tay, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 15/516,019

(22) PCT Filed: Sep. 30, 2015

(86) PCT No.: PCT/SG2015/050359
§ 371 (c)(1),
(2) Date: Mar. 30, 2017

(87) PCT Pub. No.: WO2016/053191
PCT Pub. Date: Apr. 7, 2016

(65) Prior Publication Data
US 2017/0298522 A1    Oct. 19, 2017

(30) Foreign Application Priority Data

Sep. 30, 2014 (SG) .............................. 10201406232P

(51) Int. Cl.
| | |
|---|---|
| *C23F 3/06* | (2006.01) |
| *C09K 13/06* | (2006.01) |
| *C09K 13/08* | (2006.01) |
| *C10G 75/02* | (2006.01) |
| *C10G 9/16* | (2006.01) |
| *F16L 9/02* | (2006.01) |
| *F16L 58/00* | (2006.01) |

(52) U.S. Cl.
CPC ................ *C23F 3/06* (2013.01); *C09K 13/06* (2013.01); *C09K 13/08* (2013.01); *C10G 9/16* (2013.01); *C10G 75/02* (2013.01); *F16L 9/02* (2013.01); *F16L 58/00* (2013.01)

(58) Field of Classification Search
None
See application file for complete search history.

(56) References Cited

U.S. PATENT DOCUMENTS

| | | | | |
|---|---|---|---|---|
| 5,209,820 A | * | 5/1993 | Tytgat | C23F 3/06 216/108 |
| 5,296,042 A | * | 3/1994 | Curran | C23G 1/24 134/2 |
| 6,085,519 A | | 7/2000 | Prior et al. | |
| 2005/0126588 A1 | * | 6/2005 | Carter | C11D 7/265 134/3 |
| 2005/0227878 A1 | | 10/2005 | Nordaa | |
| 2007/0018135 A1 | * | 1/2007 | McCormick | C11D 3/0073 252/70 |
| 2010/0167547 A1 | * | 7/2010 | Kamimura | C09G 1/02 438/693 |
| 2014/0038348 A1 | | 2/2014 | Kim et al. | |
| 2016/0251840 A1 | * | 9/2016 | Zuechner | E03D 9/032 4/231 |

FOREIGN PATENT DOCUMENTS

| | | | |
|---|---|---|---|
| FR | 2955332 A1 | | 7/2011 |
| KR | 10-2002-0006349 A | | 1/2002 |
| KR | 10-2010-0040010 | * | 4/2010 |
| KR | 10-2010-0040010 A | | 4/2010 |

OTHER PUBLICATIONS

PCT International Search Report, 5 pgs., dated Oct. 28, 2015.
PCT Written Opinion of the International Searching Authority, 6 pgs., dated Feb. 11, 2015.
PCT International Preliminary Rerport on Patentability, Chaprt II, 5 pgs. dated Aug. 29, 2016.

* cited by examiner

*Primary Examiner* — Shamim Ahmed
(74) *Attorney, Agent, or Firm* — Womble Bond Dickinson (US) LLP

(57) ABSTRACT

There is a formulation and a method for inhibiting carbon-based deposits on metal substrate. The method comprises the use of a formulation comprising at least one oxidizing agent and at least one etchant capable of forming free metal ions from the metal substrate, at least one sequestering agent having a ligand capable of forming a complex with the free metal ions and at least one chelating agent having a ligand capable of complexing with at least one surface metal atom.

19 Claims, 13 Drawing Sheets

[Fig. 1a]
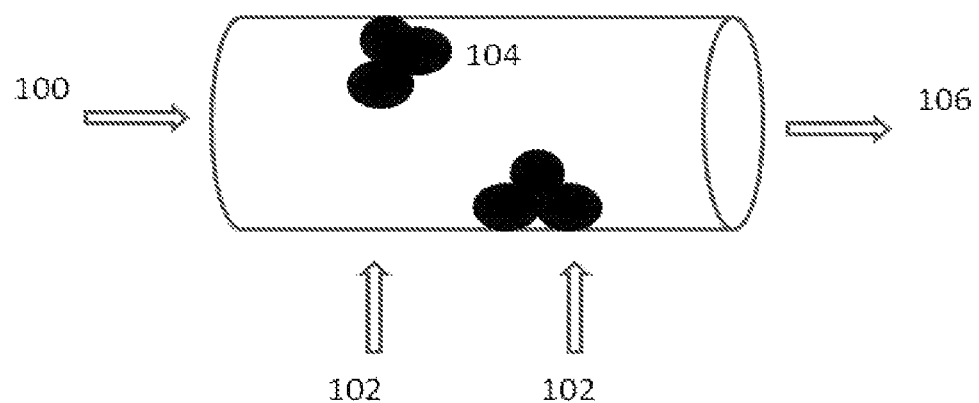
[Fig. 1b]

[Fig. 2a]
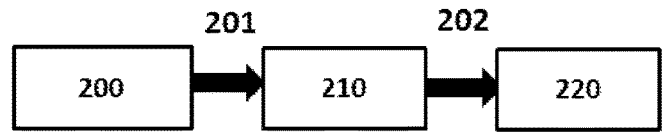
[Fig. 2b]
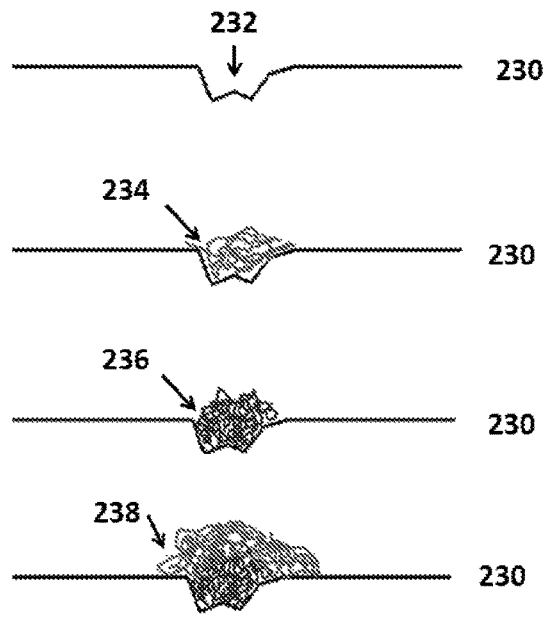
[Fig. 2c]
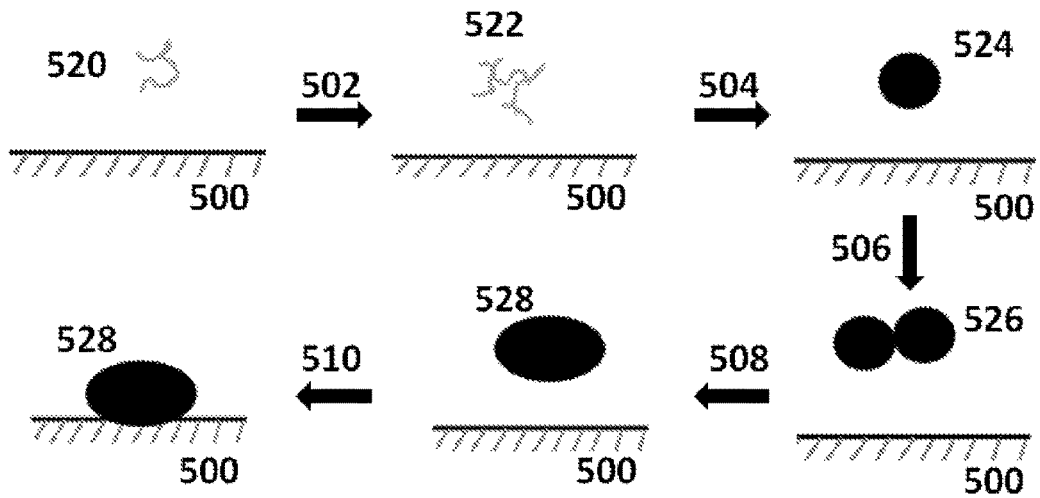

[Fig. 2d]
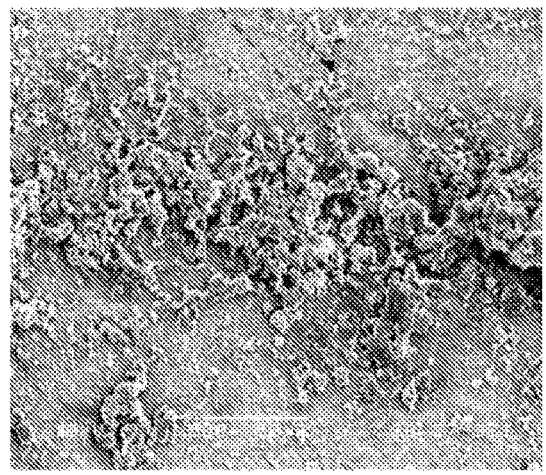
[Fig. 3a]
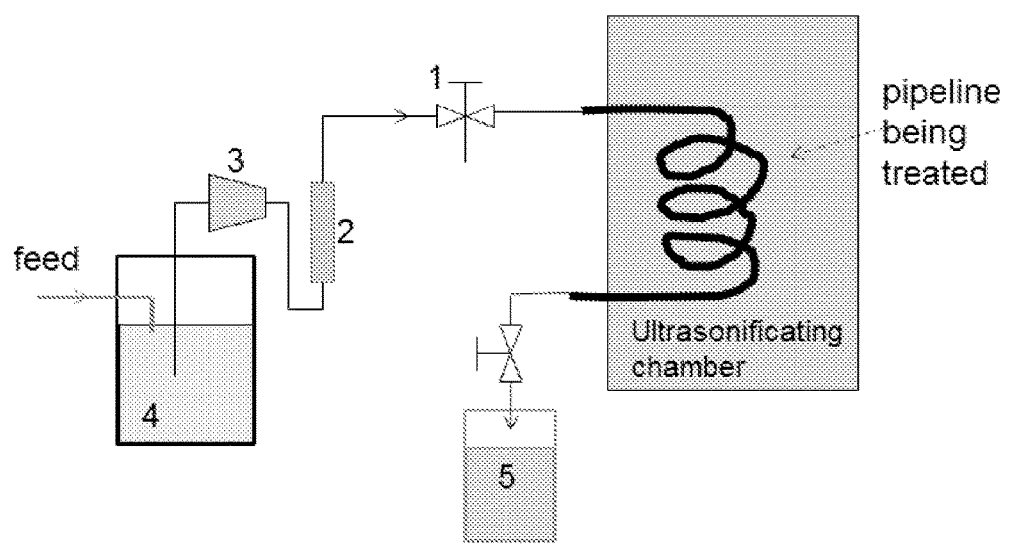
[Fig. 3b]
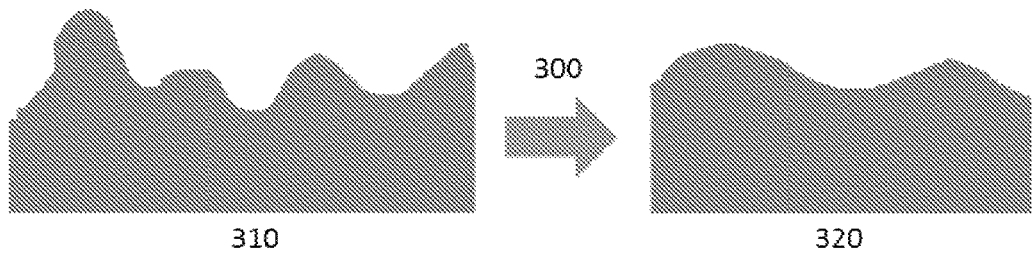

[Fig. 4]
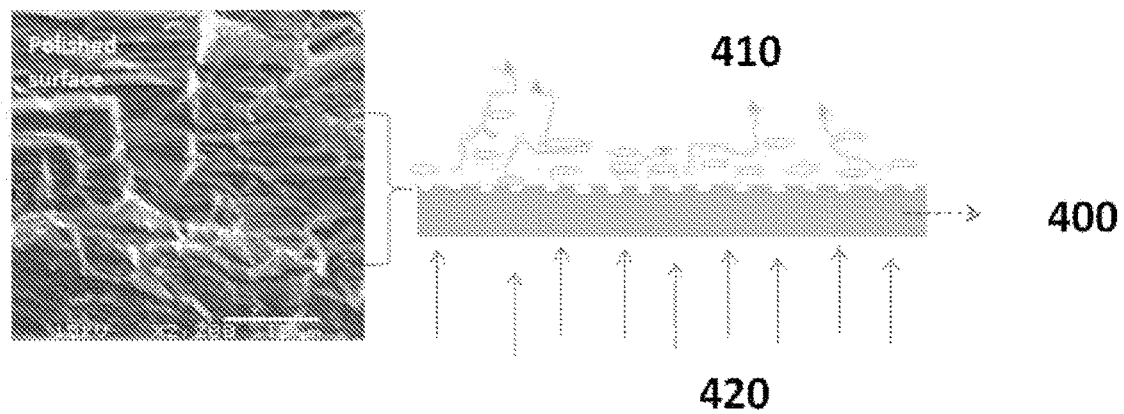
[Fig. 5]
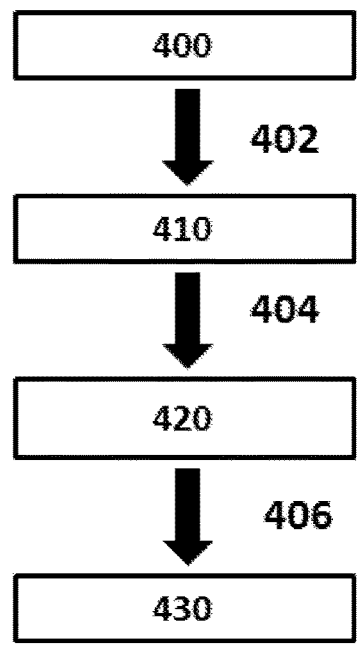

[Fig. 6]
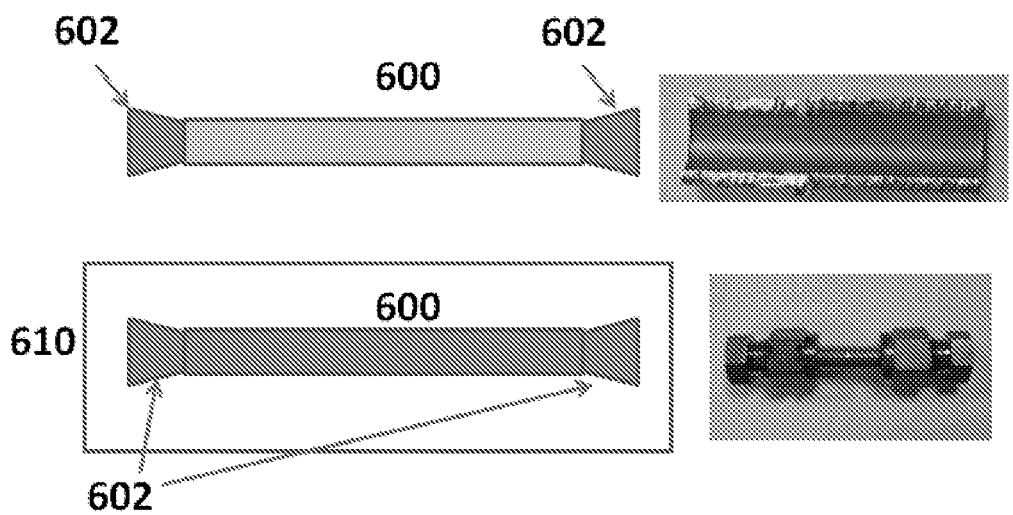
[Fig. 7a]
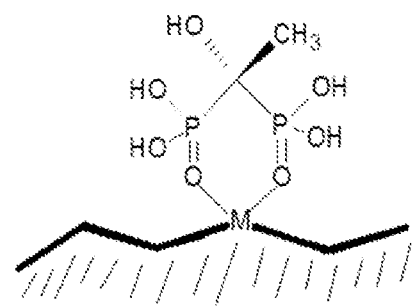
[Fig. 7b]
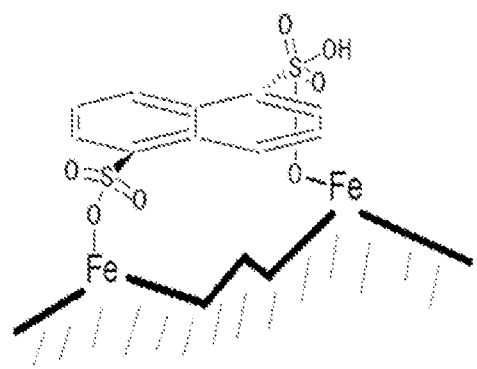

[Fig. 8a]
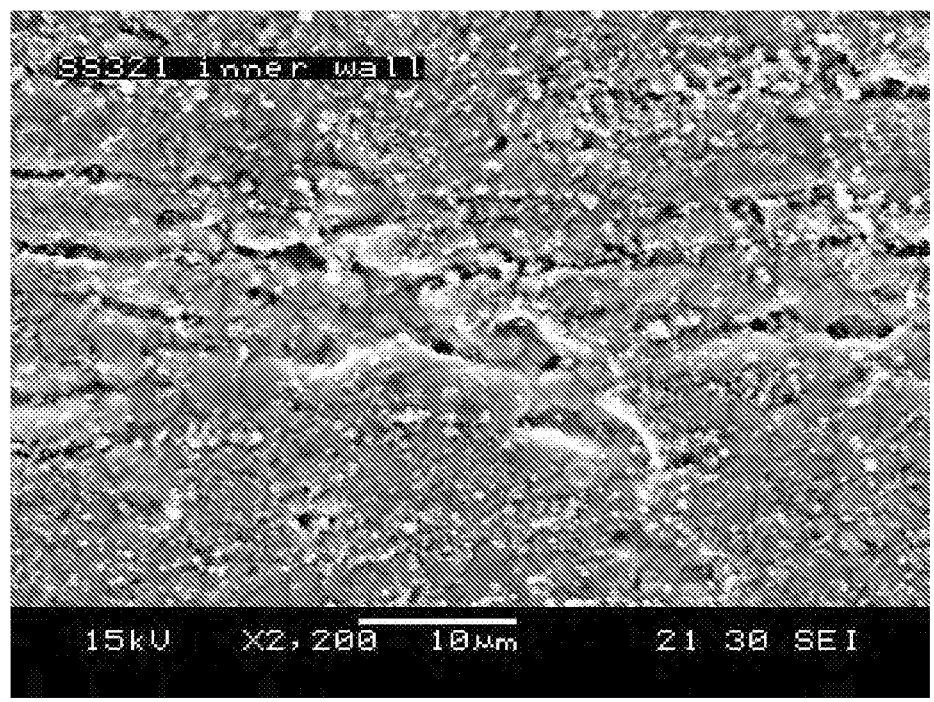
[Fig. 8b]
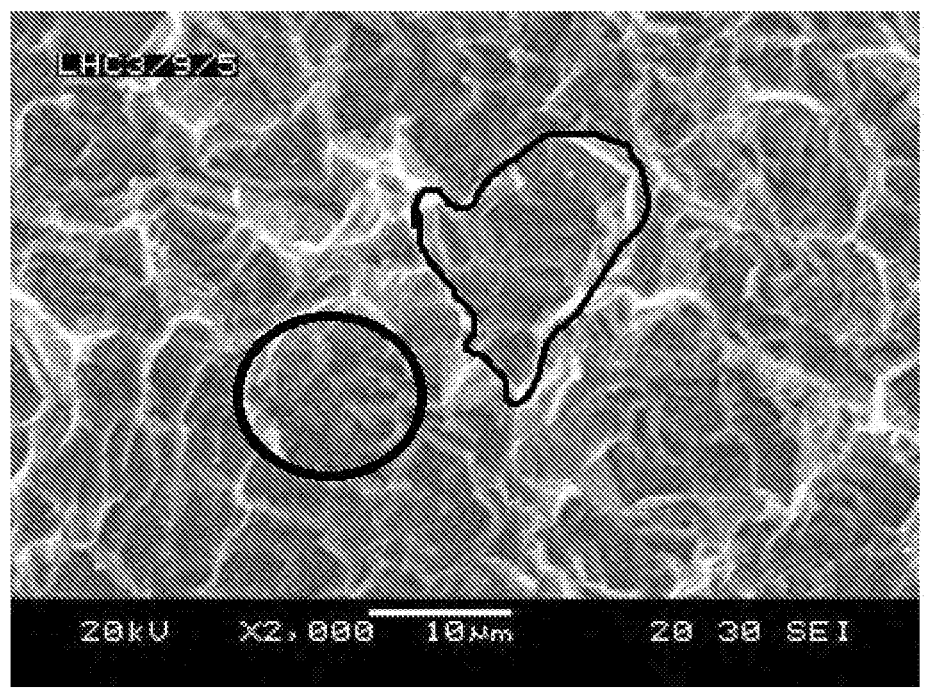

[Fig. 8c]
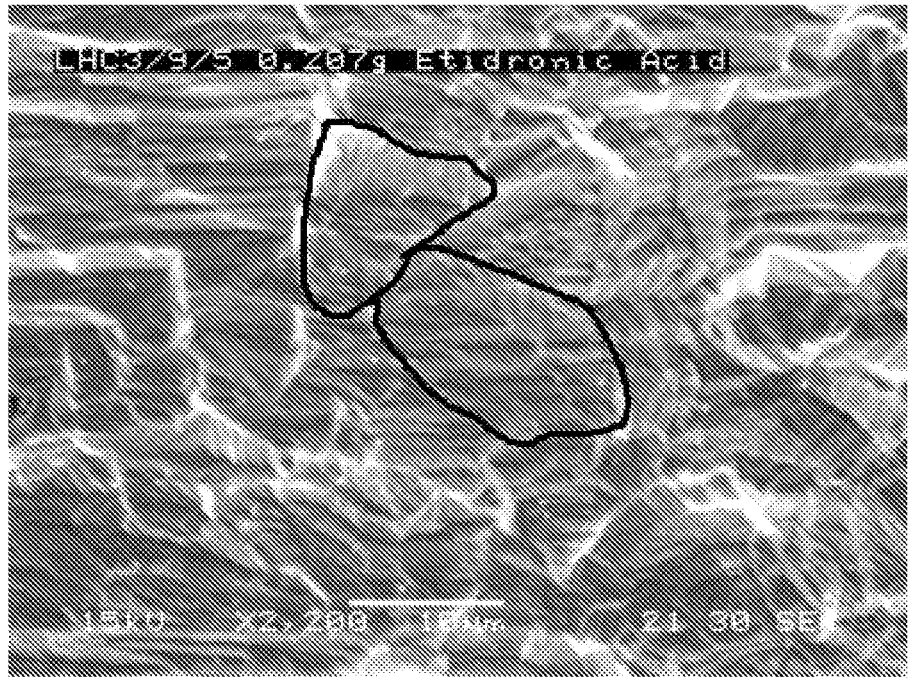
[Fig. 8d]
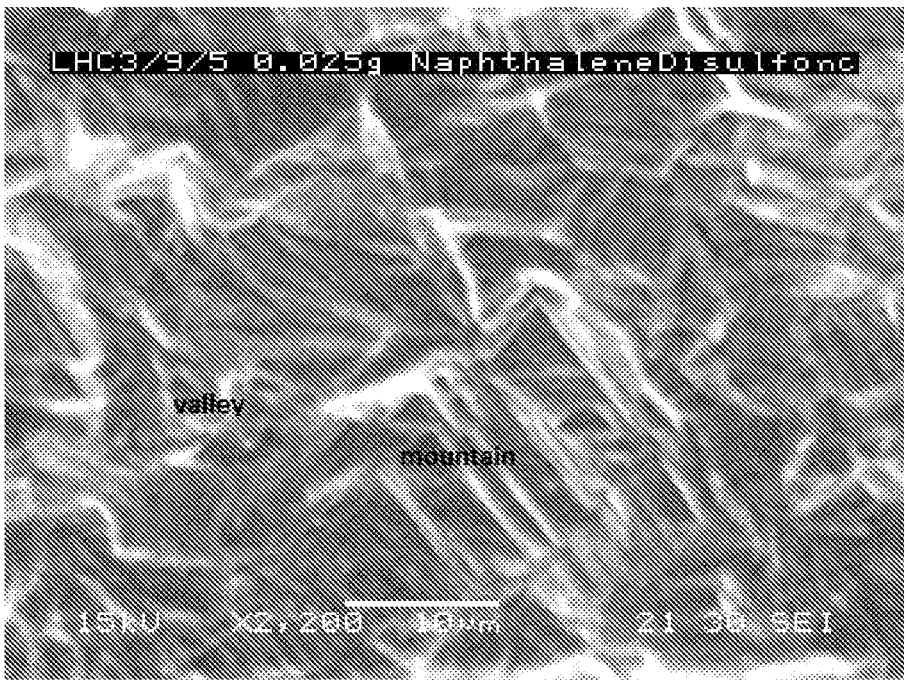

[Fig. 9a]
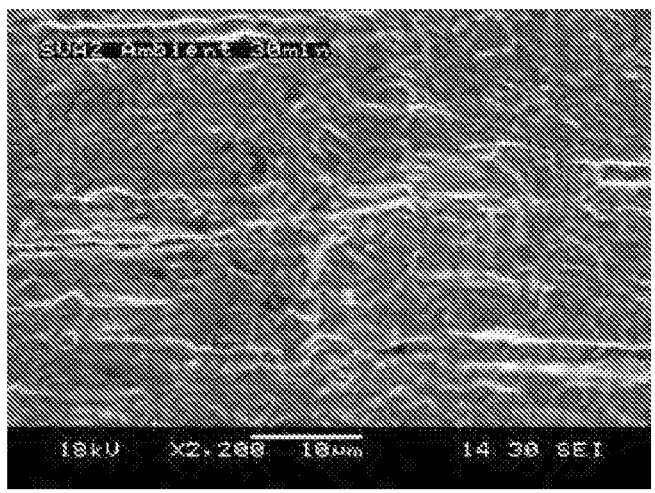
[Fig. 9b]
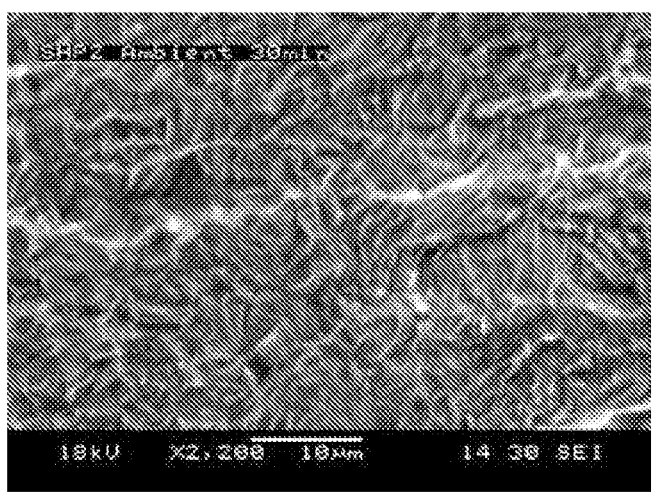
[Fig. 10a]
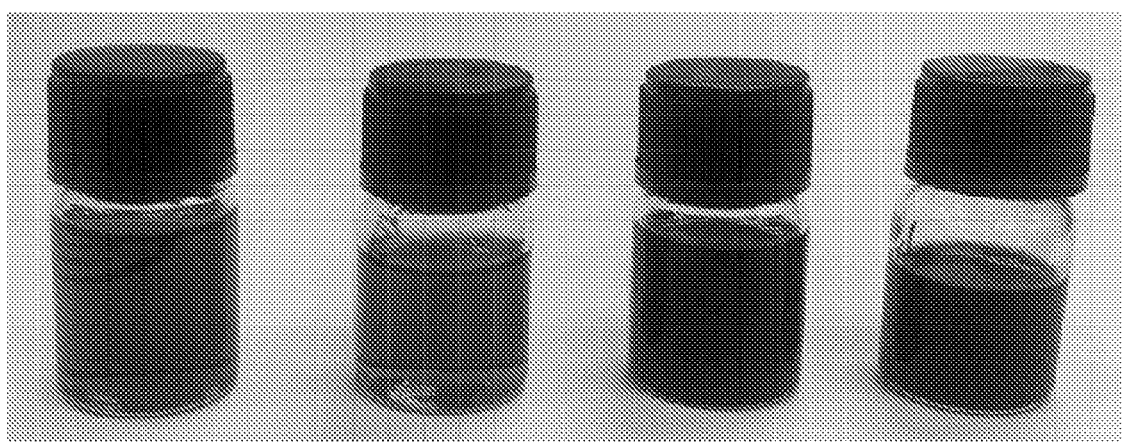

[Fig. 10b]
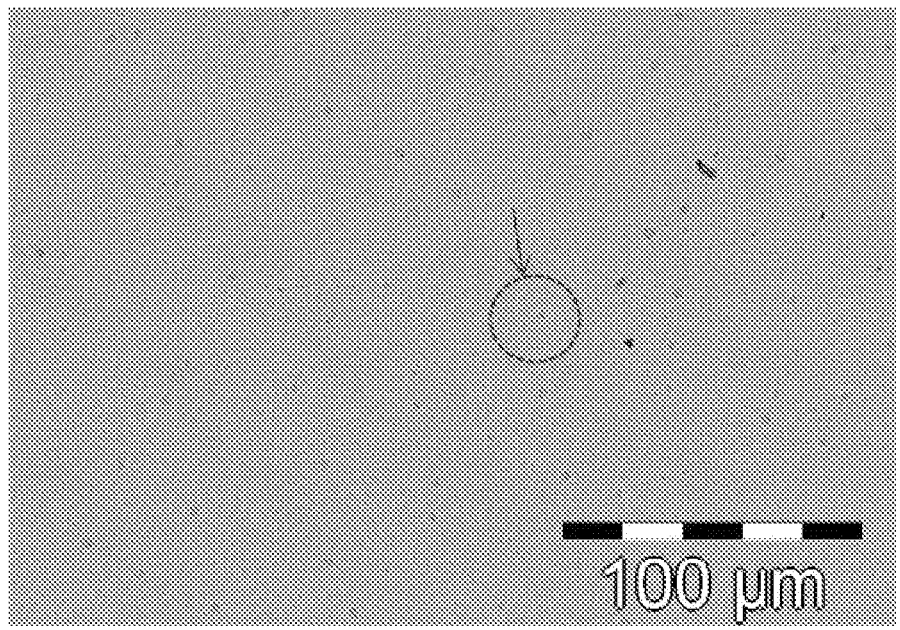
[Fig. 10c]
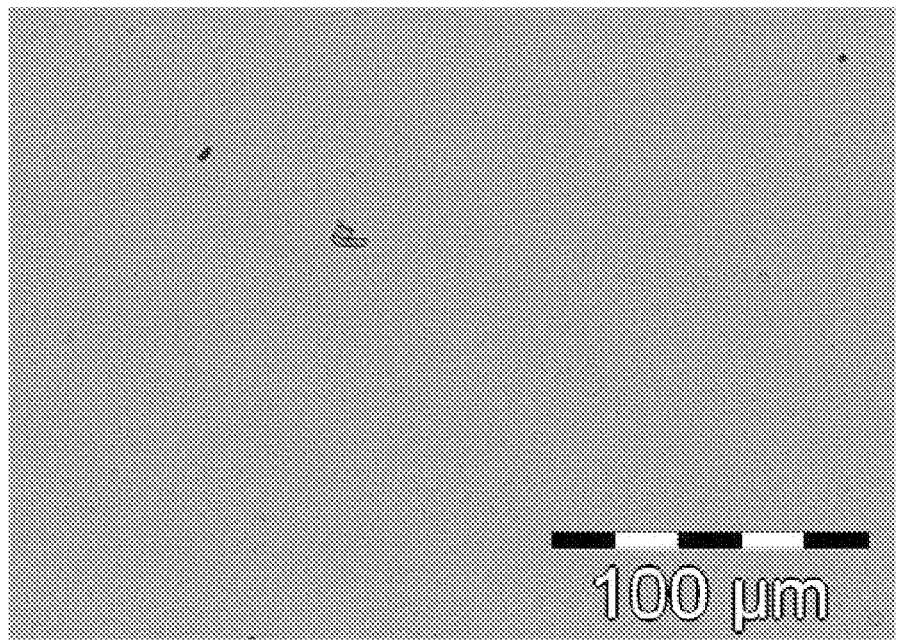

[Fig. 10d]
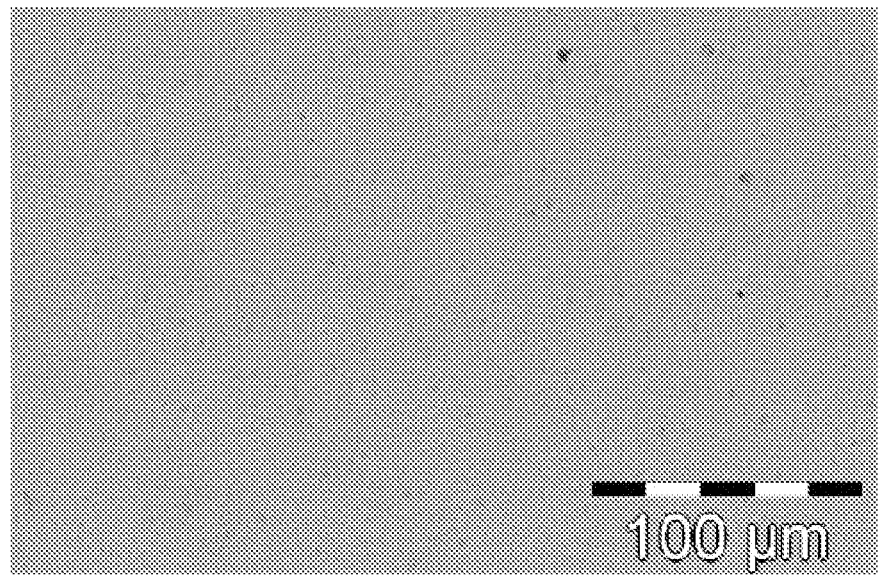
[Fig. 11a]
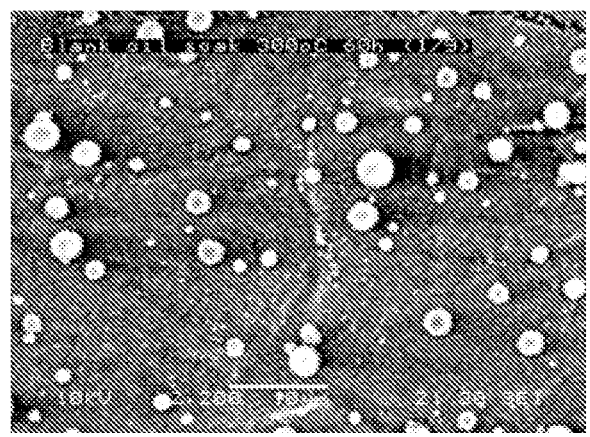
[Fig. 11b]
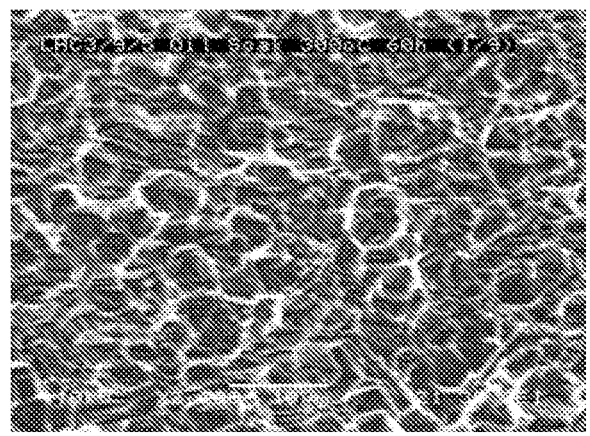

[Fig. 11c]
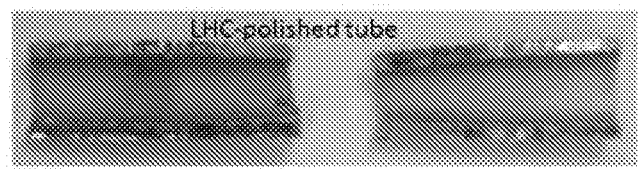
[Fig. 12a]
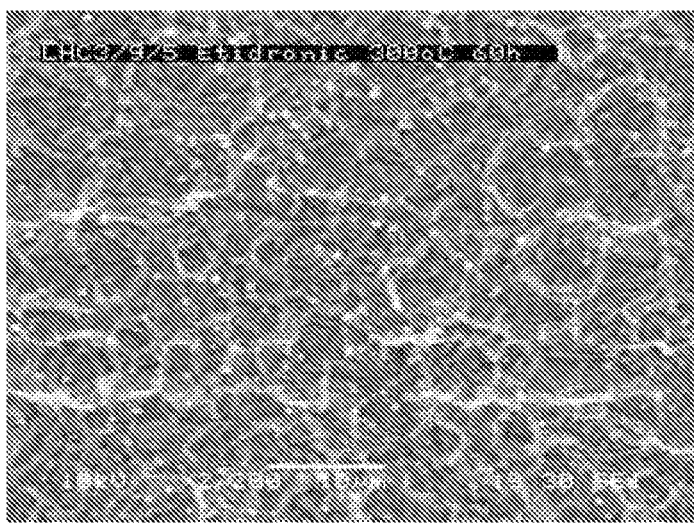
[Fig. 12b]
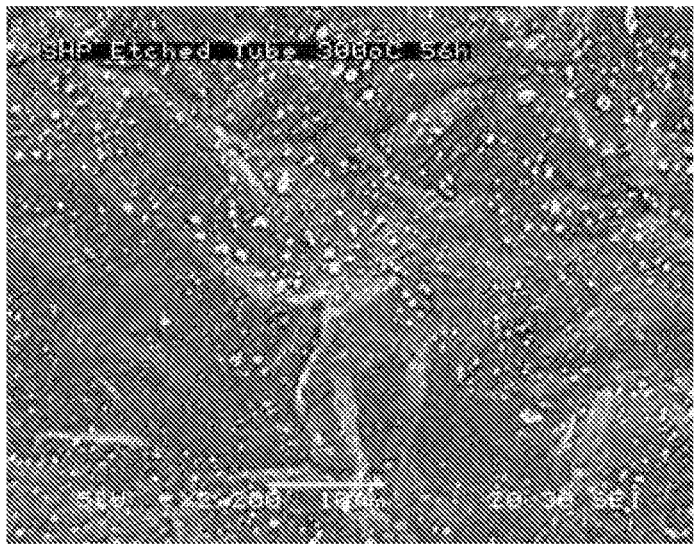

[Fig. 13a]
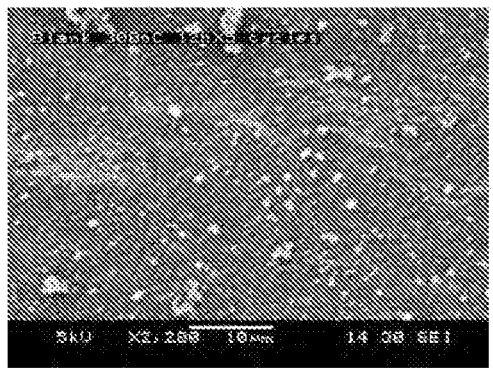
[Fig. 13b]
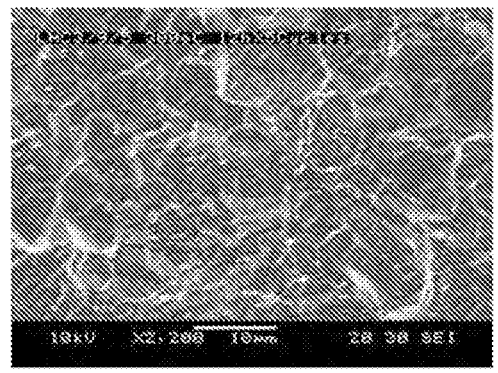
[Fig. 13c]
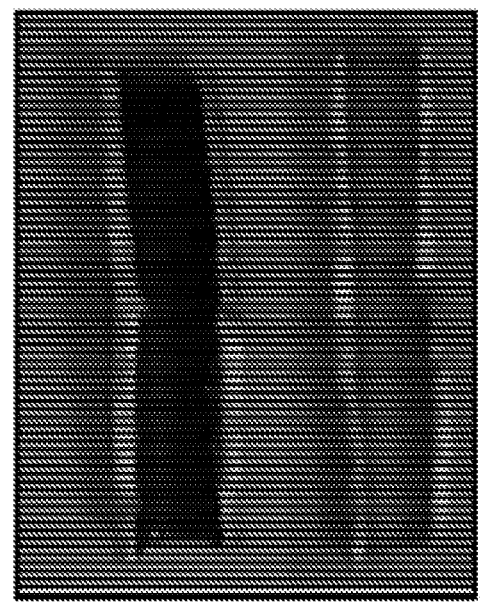

[Fig. 14]
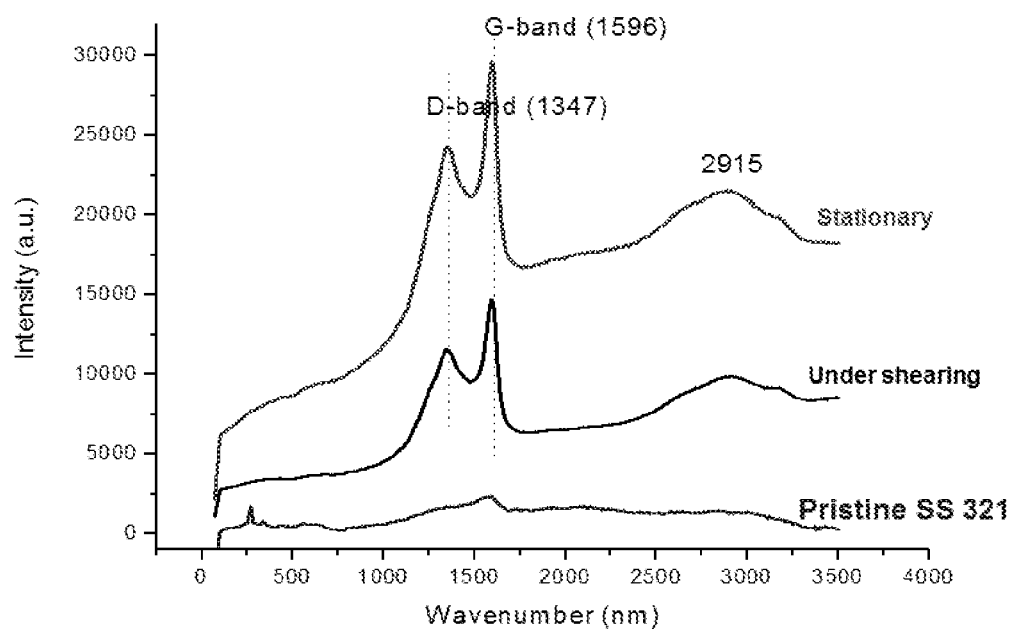

FORMULATION AND METHOD FOR INHIBITING CARBON-BASED DEPOSITS

CROSS-REFERENCE TO RELATED APPLICATIONS

This patent application is a U.S. National Phase Application of International Application No. PCT/SG2015/050359, filed Sep. 30, 2015, which claims the benefit of priority of Singapore application No. 10201406232P, filed 30 Sep. 2014, the contents of which were incorporated by reference in the entirety for all purposes.

TECHNICAL FIELD

The present invention relates to a formulation for inhibiting carbon-based deposits on a metal surface. The present invention also relates to a method for inhibiting carbon-based deposits on a metal surface.

BACKGROUND ART

The accumulation of carbon-based deposits has been a problem faced by many industries dealing with carbon-based products, either by using or producing them. Such carbon-based products may include, but not limited to, hydrocarbons.

In the petroleum industry, the buildup of coke causes significant problems, for instance, increasing pressure drop and scaling which compromise process efficiency and increases process downtime. To tackle such issues, significant cost is typically incurred for cleaning off the coke or replacing pipelines.

In another instance, severe carbon-based deposition or accumulation of coke may choke the tubes and nozzles. This may in turn lead to catastrophic consequences such as in the aviation industry. A safety alert for an operator report, published by the Federal Aviation Administration of the United States of America, described an incident where an Edelweiss A330 suffered from an uncontained engine failure during departure due to a rupture of the oil vent tube of the RB211 Trent 700 series turbofan engine. This was attributed to the blockage of an oil line caused by carbon-based deposits that led to significant loss of engine oil and consequently the uncontained engine failure.

One of the underlying causes for coke buildup may be due to the thermal degradation of hydrocarbon fluids. This problem may be commonly encountered, for example, when a hydrocarbon fluid comes into contact with a metal surface of a pipe and is exposed to heat over a long duration. This may be particularly prevalent in the automobile industry where intense residual heat radiated from an engine after shutting down (also known as heat soak) leads to fuel decomposition and coke deposition on injectors.

Similarly, coke deposition may be found in the turbines of an aircraft when the lubricant degrades in pipes due to the presence of a heat soak. The deposited coke particles may also produce an erosive effect when they get transported along a pipe in the hydrocarbon fluid, acting like abrasives and consequently wearing out other metallic parts of the aircraft system.

To develop a passivated surface for resisting coking on metal parts or tubing, a general understanding of the coking mechanism may be needed. Although the thermal decomposition of a hydrocarbon may involve complex elimination and radical chain reactions, these reactions tend to produce bulky cross-linked organic aggregates before being converted to coke particles.

In addition, the presence of metal oxides and carbon particles in the hydrocarbon fluid may accelerate the agglomeration of bulky organic aggregates as these bulky and heavy aggregates tend to possess strong adhesion and gelation tendencies. Thus, these aggregates are easily entrapped in micro-cracks and pits on a surface via physical anchoring and subsequent deposition via additional aromatization reactions may occur to cause more particles to be deposited.

Quite a handful of solutions have been developed to address the above problem and they may be classified into three types.

The first type may be categorized as a physical intervention method. An example of such a method, particularly an improved anti-coking air injection system, has been developed by General Motors. In this system, individual air flow is introduced into the engine cylinder head with electrical resistance heating elements that are periodically activated to develop radiant energy to burn off coke deposits that may form on passage side-walls.

The second category may be known as chemical inhibition which tends to rely on the addition of a particular additive into the fluid, such as a hydrocarbon stream, for inhibiting thermal degradation of the hydrocarbon that may lead to formation of coke deposits. Some examples of known additives are sulfiding agent, dihydroxybenzene, and phosphoric amide (I).

Despite the above, both categories of solution may be effective only in situations where there is a short heating duration. It may also be inappropriate for systems having static lubricants in a pipeline that is likely to be exposed to heat soak having temperatures that are capable of decomposing hydrocarbons.

In the third category, coating or reacting a surface to form a passivation barrier layer is employed.

In such methods, ceramic materials tend to be chosen since they are likely to be thermally stable and chemically unreactive. The selected ceramic material may be coated on the surface by known vapor deposition processes such as chemical or physical vapor deposition (CVD or PVD) or atomic layer deposition (ALD). Modified sol-gel coating approaches may work but variation in temperatures still undermines this approach.

Notwithstanding the above, this third strategy remains generally costly and may be difficult to apply when it comes to the interior surface of narrow pipes.

Other conventional methods may include flushing the pipe solely using an acid or a combination of acids. These acidic compositions may comprise at least one mineral acid or organic acids. However, these acidic compositions tend to be either too acidic such that the metal surface ends up being corroded or too mild such that the metal surface suffers from insufficient cleaning.

Accordingly, there is a need to overcome the limitations of existing solutions as proposed above. There is also need for enhancing a surface that becomes capable of mitigating or resisting carbon-based deposits and accumulation without suffering from these limitations.

SUMMARY OF INVENTION

According to a first aspect, there is provided a formulation for inhibiting carbon-based deposits on a metal substrate, the formulation comprising at least one oxidizing agent and at least one etchant to form free metal ions from the metal substrate, at least one sequestering agent having a ligand selected to form a complex with the free metal ions and at least one chelating agent having a ligand selected to complex with at least one surface metal atom.

Advantageously, the above formulation serves as an effective chemical polishing solution capable of inhibiting undesired deposition of carbon-based deposits on the surface of a metal substrate. This solution is capable of restructuring the surface of a metal substrate, thereby rendering the treated surface resistant to carbon-based deposits without corroding the metal substrate or constrained by the heating duration.

According to another aspect, there is provided a method for inhibiting carbon-based deposits on a metal substrate, said method comprising:

contacting said metal substrate with a formulation to inhibit carbon-based deposits on said metal substrate, wherein said formulation comprises at least one oxidizing agent and at least one etchant to form free metal ions from the metal substrate, a sequestering agent having a ligand selected to form a complex with the free metal ions and at least one chelating agent having a ligand selected to complex with at least one surface metal atom.

This method not only produces the above advantageous formulation but also protects a solid surface, particularly a metal substrate, from undesired accumulation of carbon-based deposits. This method also provides the above advantages without suffering from the aforementioned limitations.

In another aspect, there is a metal pipe treated with the formulation as defined above. This treated metal pipe would have the abovementioned advantages.

Definitions

The following words and terms used herein shall have the meaning indicated:

The term "inhibiting" is to be taken broadly to include removing, eliminating solid deposits, particularly carbon-based deposits, on a surface such as a metal substrate. It may also include preventing build-up of carbon-based deposits or prevent carbon-based substances from depositing on the metal substrate.

The phrase "carbon-based deposits" is taken broadly to refer to any substances having carbon. Such substances may include coke, charcoal or any hydrocarbon.

The term "ligand" is to be interpreted broadly to include any compounds, ions or molecules having a functional group that is capable of binding to a metal atom or ion to form a coordination complex. In this coordination complex, the metal atom or ion may be positioned as the central member (i.e. central atom or ion) of the coordination complex. In this coordination complex, at least one bond may be formed with at least one single metal atom or ion. The bonding between the metal atom or ion and ligand generally involves donation of one or more electron pairs from ligand to the metal atom or ion. The nature of metal-ligand bonding can range from covalent to ionic. Furthermore, the metal-ligand bond order can range from one to three. Ligands can include but are not limited to a lewis base.

The expression "surface metal atom" broadly refers to those atoms that are a part of a metal substrate but exposed to air. The atoms may be neutral or may carry charge. Where a surface atom carries a charge, it may be called an ion. This ion may be a free metal ion that is adsorbed on the surface or embedded in the surface metal atom lattice of a metal substrate. The ion is positively charge. Where the surface metal ion is positively charged, it may be known as a cation.

The term "peroxyacid" is taken to be an acid which contains an acidic —$CO_3H$ group. A peroxyacid may be an organic acid.

The term "peroxide", "peroxides" or derivatives thereof may broadly include, but not limited to, peroxyacid, mineral peroxide, peroxynitrite, persulfate or peroxyester which has a —$CO_3R$ group. The R in the peroxyester may be an optionally substituted $C_1$-$C_{12}$-alkyl, $C_2$-$C_{12}$-alkenyl, cycloalkyl having 3 to 12 carbon atoms, or aryl having 6 or more carbon atoms, or a 5 to 6 ring membered heterocycloalkyl or heteroaryl group having 1 to 3 hetero atoms select from N, S or O. An example of a mineral peroxide may be hydrogen peroxide.

The expression "heterocylic compound" or "heterocycle" broadly refers to a saturated monocyclic, bicyclic, or polycyclic ring containing at least one heteroatom selected from nitrogen, sulfur, oxygen, preferably from at least 1 to 3 heteroatoms in at least one ring. Each ring may be from 3 to 12 membered or having any number of carbon atoms within this range. Examples may include but not limited to 5-aminotetrazole or benzotriazole.

The term "ketone" broadly refers to a molecule having the formula group $R_2C=O$, wherein R may be an optionally substituted $C_1$-$C_{12}$-alkyl, $C_2$-$C_{12}$-alkenyl, cycloalkyl having 3 to 12 carbon atoms, or aryl having 6 or more carbon atoms, or a 5 to 6 ring membered heterocycloalkyl or heteroaryl group having 1 to 3 hetero atoms select from N, S or O.

The phrase "etchant" or "etching agent" broadly refers to a compound or substance that is capable of removing materials from a surface, whether physically or chemically. The materials removed may be in the form of an atom, an ion, a molecule or a compound.

The phrase "oxidizing agent" or "oxidant" refer to a substance that is capable of increasing the oxidation state of an ion or a particular element within a compound, a molecule or any other substance.

The phrase "sequestering agent" may refer to a substance having a ligand that can form at least one bond to at least one single free metal ion that is dissolved in an aqueous solution. In other words, a chelating agent may be a monodentate, bidentate or multidentate ligand.

The phrase "chelating agent" may refer to a substance whose molecules can form at least one bond (or a ring structure) to at least one surface metal atom. The chelating agent may form at least one bond (or a ring structure) to at least one metal ion that has been adsorbed on a solid surface such as the surface of a metal substrate. In other words, a chelating agent may be a monodentate, bidentate or multidentate ligand.

The phrase "optionally substituted" is to be interpreted broadly to mean that the group to which this term refers to may be unsubstituted, or may be substituted with one or more groups independently selected from, but not limited to, oxygen, sulfur, halogen, alkyl, acyl, ester, amino, amide, carboxylic acid, carbonyl, alkoxy, alkyloxy, alkenyl, alkynyl, cycloalkyl, aryl, heterocycloalkyl and heteroaryl. Usually these groups have 1 to 12 carbon atoms, if they contain carbon atoms.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of the abovementioned formulation and method will now be disclosed.

There is provided a formulation for inhibiting carbon-based deposits on a metal surface. This formulation comprises at least one oxidizing agent and at least one etchant to form free metal ions from the metal substrate, at least one sequestering agent having a ligand selected to form a complex with the free metal ions and at least one chelating agent having a ligand selected to complex with at least one surface metal atom. The free metal ions may be dissolved in the solution.

This formulation may be capable of altering the surface topography or morphology of a solid substrate, particularly a metal substrate. The altered surface topography/morphology may be viewed at a microscopic or nanoscopic level. This formulation may be an aqueous solution. The altering of the surface topography may be used to address the original surface defects of a metal substrate that may lead to increased carbon-based deposits.

The metal substrate may be made from metals, such as but not limited to, iron, carbon-steel, stainless steel, iron-based alloy, any other ferrous metal or alloy such as ferrous steel. The metal substrate may also be made from any non-ferrous metal or alloy. This may include titanium alloy or aluminium alloy. For stainless steel metal substrate, the stainless steel may be of varying industrial grades known to a person skilled in the art, particularly stainless steel grade 321 (SS321).

The present formulation is capable of restructuring the surface of a solid substrate particularly a metal substrate, so as to reduce or eliminate undesired particle deposition and rusting on the surface. The restructuring of the surface topography may be viewed at the microscopic or nanoscopic level. The deposition of unwanted particles, which may include rust, is detrimental as it is likely to cause increasing pressure drop which leads to lower energy efficiency for a production process. It also forms a detrimental layer that can compromise heat transfer efficiencies.

The deposition of such particles arises when the surface (regardless of whether interior or exterior) of a metal tube or pipe is not even. The surface of a metal pipe or tube may be uneven due to its production method, such as cold drawing. Such uneven surfaces are likely to obstruct fluid flow and cause particles to deposit on the surfaces. In instances, where a stream containing hydrocarbon such as oil or other organic fluids with carbon-based particulates flow through the tube or pipe, these carbon-based particulates tend to deposit on the surface of the tube or pipe and cause the abovementioned issues.

Another advantage of the present formulation is that it may improve the anti-rusting property of a surface treated with it. This is because the restructured surface may be capable of entrapping a thin oil film and this may prevent air from contacting the surface of the metal substrate.

The formulation may be a solution or a fluid introduced into the conduit of a pipe or tube during treatment of the metal substrate with the formulation. Hence, the formulation may be taken to be a solution or a fluid adjacent to the surface of a metal substrate.

Accordingly, the present formulation may comprise at least one oxidizing agent capable of forming free metal ions on the metal substrate. The oxidizing agent may be an aqueous oxidizing agent. The free metal ions may be dissolved into the solution or the fluid flowing adjacent to the surface of the metal substrate. The free metal ions may also be adsorbed on the surface of the metal substrate to form the surface metal ions that are capable of complexing with the chelating agent (as will be mentioned further below).

The oxidizing agent may be selected from the group consisting of peroxides, peroxyacids, peroxyesters, permanganates, mineral acids, nitrates, persulphates, perborates, perchlorates, perchlorites, chlorates, chlorites, percarbonates, derivatives thereof and combinations thereof. The oxidizing agents may be peracetic acid, peroctanoic acid, peroxodisulfuric acid or hydrogen peroxide. A suitable mineral acid for use as an oxidizing agent may include, but not limited to, nitric acid.

Accordingly, the at least one oxidizing agent may be 10 to 15, 11 to 15, 12 to 15, 13 to 15, 14 to 15 wt % of the formulation, based on the weight of the formulation. The at least one oxidizing agent may be any amount or range falling within this range.

When the present formulation is used, hazardous gaseous oxidizing agents such as oxygen, ozone, chlorine, nitrogen dioxide, sulfur dioxide or sulfur trioxide may be avoided. Hence, the risk of an explosion when using the gaseous oxidizing agent, for instance oxygen, may be avoided through the use of the present formulation.

The present formulation may comprise at least one etchant capable of forming free metal ions on the metal substrate. The free metal ions may be dissolved into the solution or the fluid flowing adjacent to the surface of the metal substrate. The free metal ions may also be adsorbed on the surface of the metal substrate. These adsorbed surface metal ions are capable of complexing with a chelating agent.

The etchant may be a mineral acid or an organic acid. The at least one etchant may be an acid selected from the group consisting of hydrochloric acid, sulfuric acid, nitric acid, trifluoromethanesulfonic acid, fluorosulfuric acid, trichloroacetic acid, trifluoroacetic acid and combination thereof. The etchant or etching agent may also be a superacid or their combination thereof. A superacid may be taken to be an acid with an acidity greater than that of 100% pure sulfuric acid or a medium in which the chemical potential of the proton is higher than that of pure sulfuric acid.

Accordingly, the at least one etchant may be 50 to 70, 50 to 60 or 60 to 70 wt % of the formulation, based on the weight of the formulation. The at least one etchant may be any amount or range falling within these ranges.

The formulation may comprise at least one sequestering agent having a ligand capable of complexing with the free metal ions in solution as described herein. This sequestering agent may be called a coordination ligand or an ion-sequestering agent.

The at least one sequestering agent may be an amino acid selected from the group consisting of glycine, threonine, aspartic acid, glutamic acid and serine. The at least one sequestering agent may also be a hydroxycarboxylic acid selected from the group consisting of malic acid, gluconic acid, citric acid, tartaric acid, glycolic acid and lactic acid.

Accordingly, the at least one sequestering agent may be 20 to 25 wt % of the formulation or any amount or range falling within this range, based on the weight of the formulation.

The ligand of the sequestering agent may be as defined above. It may be a substance that is capable of forming a coordinate bond with a metal atom or ion. Typically, the oxygen atom in carboxylic acid, hydroxyl, and ether groups or the nitrogen atom in amine, azole, pyridine, and pyrrolidone groups are capable of forming coordination bond with metals, in particular transition metal ions and atoms.

This formulation may comprise at least one chelating agent having a ligand capable of complexing with at least one surface metal atom and/or at least one metal ion adsorbed on the metal substrate. The chelating agent may have ligands capable of complexing with two or more atoms/ions. Hence, the chelating agent may form complex with 2 or more atoms, 2 or more ions or with a combination of atoms and ions. When complexed with a surface metal atom or metal ion adsorbed on the substrate surface, this chelating agent may prevent the etchant from reacting with the surface, thereby forming a protruding contour or ridge. This also means that the complex may be formed on the surface of a metal substrate which may eventually lead to the formation of a contour or ridge after etching. The surface metal atom may originate from the metal surface. For instance, an iron atom may be located on an iron or stainless steel substrate. The surface metal ion may be derived from the use of the etchant as mentioned above.

The chelating agent may be a substance whose molecules can form at least two bonds (possibly resulting in a ring structure) to the surface metal atom or metal ion adsorbed on the metal substrate.

The at least one chelating agent may be selected from the group consisting of ketone, phosphonic acid, sulfonic acid and an optionally substituted heterocyclic compound having at least 3 heteroatoms. This may enable the formation of a stable ring coordination structure.

Where the chelating agent is a ketone, it may be acetic acetone. Where the chelating agent is a phosphonic acid, it may be etidronic acid. Where the chelating agent is a sulfonic acid, it may be 1,5-naphthalene disulfonic acid (NDSA). Where the chelating agent is an optionally substituted heterocyclic compound having at least 3 heteroatoms, it may be 5-aminotetrazole or benzotriazole.

The ligand of the chelating agent may be as defined above. It may be a substance that is capable of forming a 5 or 6-membered ring structure with a metal atom or ion such as an iron ion through a coordinate bond. Specifically, the chelates formed may favour their order assembling on the metal substrate in order to pattern or modify the topography of the surface. The ligand may be the oxygen or nitrogen atom as described above.

Accordingly, the at least one chelating agent may be 0.5 to 1.5, 0.5 to 1.0 or 1.0 to 1.5 wt % of the formulation, based on the weight of the formulation. The at least one chelating agent may be any amount or range falling within this range.

It should be noted that the amount of oxidizing agent, the etchant, the sequestering agent and the chelating agent may vary within the specified ranges. The amount of each of these four components may also fall outside the above specified ranges as long as the combination of the amounts for each of these four components eventually works out to have the advantage of inhibiting carbon-based deposits. The amount for each of these four components may add up to 100 wt % of the formulation.

A suitable combination for the formulation may include 12.3 wt % of at least one oxidizing agent, 64 wt % of at least one etchant, 22.7 wt % of at least one sequestering agent and 1 wt % of at least one chelating agent.

The above specified ranges or amounts may be applied for treating a specific surface area of the metal substrate. This surface area may be 1 to 10, 2 to 10, 3 to 10 or 5 to 10 cm$^2$ or any surface area falling within this range. This surface area may be 5 cm$^2$. If a larger or smaller surface area is to be treated, the above specified ranges or amounts for each of the components may be adjusted proportionately in relation to the formulation.

Each designated surface area of the metal substrate to be treated may require 1, 2, 3, 4, 5, 6, 7, 8, 9 or 10 g of the present formulation. Any other amounts of the formulation may be used depending on the surface area to be treated. For instance, 5.5 g of the present formulation may be used to treat 1 cm$^2$ of the metal substrate surface by the treatment methods disclosed below.

Optionally, the formulation may comprise a stabilizing agent. This stabilizing agent may be functionally the same as the chelating agent in that it also possesses a ligand capable of complexing with at least one surface metal atom or at least one metal ion adsorbed on the metal substrate or a combination of both. Hence, this stabilizing agent may also be known interchangeably as a chelating agent. Suitable stabilizing agents may include, but not limited to amphiphilic organic compounds with planar geometry that are capable of forming a cap structure with the metal atoms or ions adsorbed on the metal substrate, such as the various iron species Fe, $Fe^{2+}$ or $Fe^{3+}$, Ni, $Ni^{2+}$, Cr, $Cr^{3+}$, W, $W^{2+}$, Ti or $Ti^{2+}$ adsorbed at the surface of the metal substrate. An amphiphilic compound may be taken as a chemical compound that possesses both hydrophilic (or polar) and lipophilic (or non-polar) properties. An amphiphilic compound may also contain hydrophobic properties in addition its hydrophilic properties. These stabilizing agents may include NDSA, 5-aminotetrazole or benzotriazole. The cap structure is illustrated in the accompanying figures, particularly FIGS. 7a and 7b.

The abovementioned components, particularly the etchant, the oxidizing agent, the sequestering agent, the chelating agent and the stabilizer may be water soluble.

The free metal ions or the metal ions adsorbed on the metal substrate may be selected from the group consisting of $Fe^{2+}$, $Fe^{3+}$, $Cr^{3+}$, $Ni^+$, $Ti^+$, $Ti^{2+}$, $W^+$ and $W^{2+}$. Depending on the composition of the metal substrate, other ions not listed above may complex (attach or form a bond) with the sequestering agent, chelating agent and/or the stabilizing agent.

The at least one surface metal atom may be selected from the group consisting of Fe, Cr, Ni, Ti and W. Other atoms not listed herein may be included. Depending on the composition of the metal substrate, other metal atoms not listed above may form coordination bonds with the sequestering agent, chelating agent and/or the stabilizing agent.

In order to provide the above technical effects, the present formulation needs to have at least one etchant, at least one oxidizing agent, at least one sequestering agent, at least one chelating and optionally at least one stabilizing agent. This is because the above advantages may only be attained when these four components are present in combination in the currently disclosed formulation. When the optional stabilizer is added into the formulation, the proportion of the other four components, namely the oxidizing agent, the etchant, the sequestering agent and the chelating agent may be maintained in accordance with the weight percentages as mentioned above and as long as all components used to form the formulation adds up to 100 wt %. The amount of these four components may be further adjusted accordingly when used with the optional stabilizer as long as they obey the proportions as described herein.

The roles of these four different components for the present formulation may be explained as follow. The etchant (e.g. hydrochloric acid (HCl)) may remove surface rust ($Fe_2O_3$) from a metal substrate. It may also be capable of removing the metal component from a metal substrate (e.g. stainless steel surface). The metal component may comprise other metals apart from iron.

Meanwhile, the role of the oxidizing agent (e.g. hydrogen peroxide) serves to oxidize the metal component. For instance, the oxidizing agent may convert a metal atom or ion such as iron or ferrous ion ($Fe^{2+}$), supposing that the metal substrate comprises iron or steel, to ferrous ion or ferric ion ($Fe^{3+}$), respectively. This may be because the ferric ion has a larger reaction equilibrium constant to combine with a sequestering agent (e.g. lactic acid) compared to ferrous ion. The formation of a ferric ion-sequestering agent complex may be needed to stabilize iron in the aqueous phase. If not, the metal ion (e.g. ferrous ion) may undergo hydrolysis to form $Fe(OH)_2$ precipitate when the concentration of free metal ions reaches a sufficient concentration for this to occur. If the precipitates form, the substrate may become coated with the metal precipitate (e.g. $Fe(OH)_2$) and the surface may not be treated with the present formulation effectively.

Lastly, the chelating agent (e.g. etidronic acid) may function as an adsorbate by chelating or forming a ligand with the surface metal atoms at morphologically protruded locations of the metal substrate. For instance, if the metal substrate comprises iron, it may form a bond and chelate with the surface iron atoms or ions of the metal substrate. This may help to foster the development of a desired microstructure, thereby restructuring the surface or topography of the metal substrate to attain the above advantages.

Because the chelating agent complexes with a surface metal atom or ion adsorbed on the surface of the metal substrate, the chelating agent protects the area where the complex is formed from being etched away by the etchant. The surrounding area that is not covered by the complex thus forms the valley or concave while the area covered by the chelate complex forms the protruding contours or ridges.

The components of the formulation may also be present in a particular weight ratio. Accordingly, the weight ratio of the at least one oxidizing agent to the at least one etchant may be 0.2:2 to 0.2:2.1, 0.2:2 to 0.2:2.2, 0.2:2 to 0.2:2.3, 0.2:2 to 0.2:2.4, 0.2:2 to 0.2:2.5 or 0.2:2 to 0.2:3. This weight ratio may be any ratio falling within this range. A suitable weight ratio of the at least one oxidizing agent to the at least one etchant may be 0.1:1. The weight ratio of the at least one etchant to the at least one sequestering agent may be 5:4 to 5:6, 5.5:4.5 to 5.5:6 or 5:4.5 to 5:5.5 or any range or ratio falling within this range. The weight ratio of the at least one sequestering agent to the at least one chelating agent may be 4:0.1 to 5:0.3, 5:0.1 to 5:0.3, 4:0.1 to 5:0.2 or any ratio falling within this range.

There is also provided a method for inhibiting carbon-based deposits on a metal substrate. This method may comprise the step of contacting the metal substrate with the present formulation to inhibit carbon-based deposits on the metal substrate, wherein the formulation comprises at least one oxidizing agent and at least one etchant to form free metal ions from the metal substrate, a sequestering agent having a ligand selected to form a complex with the free metal ions and at least one chelating agent having a ligand selected to complex with at least one surface metal atom. The free metal ions may be dissolved in solution as described above.

As mentioned above, the surface treated with the present formulation via the present method is likely to possess microstructures or contours that are capable of inducing turbulent heat flux that initiate turbulent fluid flow over surface. The turbulent fluid flow hinders adsorption or deposition of particulates, such as carbon-based deposits onto the surface of the metal substrate. The turbulent fluid flow arising from the present method also reduces the thermal decomposition rate of hydrocarbon by minimizing local temperature gradient or the presence of local hotspots.

In the present method, the components used for the present formulation are as defined above. The ratio or amounts for each of the components used in the present method may be as defined above or as described below.

In one instance, the at least one oxidizing agent used to prepare the formulation may be present in an amount from 1 to 15, 5 to 15, 10 to 15 or 5 to 10 ml. When such a volume is used, the concentration of the aqueous oxidizing agent solution may be 20 wt %. The at least one etchant used to prepare the formulation may be present in an amount from 5 to 80, 5 to 50, 20 to 80 or 50 to 80 ml. When such a volume is used, the concentration of the aqueous etchant solution may be 37 wt %. The at least one sequestering agent may be present in an amount from 2 to 30, 5 to 30, 10 to 30 or 20 to 30 ml. The at least one chelating agent used to prepare the formulation may be present in an amount from 0.01 to 0.25, 0.03 to 0.25 or 0.01 to 0.03 g. The amounts used for each of these components may vary as long as they follow the guidance set out above, particularly the resultant weight percent for each of the components used to prepare the formulation as indicated above. The amounts used for each of these components may also be adjusted accordingly as long as the above advantages are attained.

The concentration of the etchant used may be 25 to 45, 30 to 45, 40 to 45 or 30 to 40 vol % or any amount falling within this range. For instance, 37 vol % aqueous HCl may be used as the etchant. The concentration of the oxidizing agent used may be 10 to 30, 20 to 30 or 10 to 20 vol % or any amount falling within this range. For instance, 20 vol % hydrogen peroxide may be used as the oxidizing agent. In one instance, pure lactic acid may be used as the sequestering agent, editronic acid may be used as the chelating agent and benzotriazole may be used as the stabilizer. A suitable weight fraction of the different components of the formulation may be etchant comprising 52 wt %, the oxidizing agent comprising 5 wt %, the sequestering agent comprising 42 wt % and the chelating agent comprising 1%. Other weight fraction combinations may be possible depending on the metal substrate to be treated and/or the different chemicals used for each of these components when making the present formulation. Likewise, the amounts for each of these components used may be adjusted accordingly as long as the above advantages are obtained.

In a particular instance, the amount of these four components used to make the present formulation may be as follow. Where $H_2O_2$ is used as the oxidizing agent, the amount used may be 3 ml. Where HCl is used as the etchant, the amount used may be 9 ml. Where lactic acid is used as the sequestering agent, the amount used may be 5 ml. Where etidronic acid is used as the chelating agent, the amount used may be 0.21 g. These amounts may be applicable for treating 1 to 10 $cm^2$ of the surface of the metal substrate. This combination of amounts may be used for treating 5 $cm^2$ of surface of the metal substrate. The amounts used for each of these components may be scaled up to treat a bigger area.

When making the formulation, the dose of the chelating agent (e.g. etidronic acid) may affect the surface topography. For example, an increase in etidronic acid from a dose of 0.21 g (0.78 wt %) to 0.4 g (1.5 wt %) may bring about the highest concentration of ridges and grain edges or highest average surface roughness. However, this may become counterproductive and heavy coking may occur on the surface on the metal substrate since there is likely to be more protruding surfaces that may lead to the deposition of particulates.

In another instance, if the dose of the etchant (e.g. HCl) is too high, over-polishing or severe etching may occur which may lead to the same deleterious effect. It should be noted that the dose of the oxidizing agent (e.g. $H_2O_2$) may have to follow that of the etchant in order to transform the metal ions (e.g. ferrous to ferric ions) as explained above. Lastly, the dose of the sequestering agent (e.g. lactic acid) may have to be sufficient such that the amount present in the formulation suffices to chelate with the $Fe^{3+}$ ion produced.

It may be possible that the chelating agent (e.g. etidronic acid) may exert a significant influence on the formation of the microstructures of the treated surface but not the sequestering agent (e.g. lactic acid). This phenomenon may be attributed to the different chelating selectivity between the ligands of the sequestering agent and the chelating agent. For instance, etidronic acid may selectively adsorb on ridges and grain edges by forming chelates with Fe while lactic acid may complex with $Fe^{3+}$ in the bulk of solution. Hence, it may be possible that the chelating selectivity depends on, for instance, the size and charge between the ligand of the sequestering agent and the chelating agent in relation to the central metal or ion, the Gibbs free energy released from the coordination, the pH of the reaction medium and the solubility of the components used.

The above ranges or values indicated for each of the components may be used or altered as long as its usage meets the earlier weight percentages or ratio requirements as set out above for each of the four components.

The present method may further comprise a step of washing or rinsing the metal substrate with water after treatment with the present formulation. After rinsing or washing, the metal substrate may be completely free of the formulation.

In the present method, the components of the formulation may be applied simultaneously or sequentially in order to create the microstructures on the surface.

For instance, the etchant, the oxidizing agent, the sequestering agent and the chelating agent may be first mixed together to form the formulation. Subsequently, the formulation may be contacted with the surface of the metal substrate. In another instance, the etchant and oxidizing agent may be first applied onto the metal substrate followed by the sequestering agent and the chelating agent. The order in which these components are mixed may be selected such that it aids in the convenience of preparing the formulation.

The formulation may also be first prepared and kept aside before contacting with the surface of the metal substrate. For instance, the solution may be left to stand for 1 day in the dark at ambient temperature before use.

As mentioned above, the free metal ions or the metal ions adsorbed on the metal substrate may be selected from the group consisting of $Fe^{2+}$, $Fe^{3+}$, $Cr^{3+}$, $Ni^+$, $Ti^+$, $Ti^{2+}$, $W^+$, $W^{2+}$. The sequestering agent and/or chelating agent used in the present method may form a complex with any of these metal ions, or other atoms or ions which may be present depending on the composition of the metal substrate.

As mentioned above, the at least one surface metal atom may be selected from the group consisting of Fe, Cr, Ni, Ti and W. Other atoms not listed herein may be included. Depending on the composition of the metal substrate, other metal atoms not listed above may form coordination bonds with the sequestering agent, chelating agent and/or the stabilizing agent.

The present method may be performed in two ways. One is known as the flowing treatment method while the other is known as the immersion treatment method. The present method need not be limited to these two ways but other possible methods which lead to the above advantages can also be carried out. The immersion treatment may be considered a batch method while the flowing treatment may be considered a continuous method.

In the immersion method, the metal substrate may be brought into contact with the present formulation by soaking it in the formulation. The formulation/metal substrate surface area ratio may be 0.5 to 2.5 $ml/cm^2$, 0.5 to 1 $ml/cm^2$ or 1 to 2.5 $ml/cm^2$ or any other ratio or range falling within these ranges. The ratio may depend on the components used to prepare the formulation or the kind of metal substrate to be treated. A suitable ratio may be 2.1 $ml/cm^2$.

The immersion may be commenced at 20 to 30° C. or any other temperatures as long as the formulation remains in the liquid state. The immersion may be carried out between 101,325 Pa to 506,625 Pa (1 to 5 atm), or 202,650 Pa (2 atm), or 303,975 Pa (3 atm) or 405,300 Pa (4 atm) or any pressure or ranges falling within this range. A convenient pressure may be atmospheric pressure which is about 101,325 Pa.

The soaking duration is not particularly limited to any time and may be any period of time in order to obtain the abovementioned advantages.

During the immersion, heat and gas may be released. The heat and gas may be released any time after or during contact of the metal surface with the present formulation. Due to this, the temperature of the formulation may be increase to 50 to 100° C. or 70 to 80° C. or any other temperatures. Subsequently, the temperature reduces back to its original room temperature.

The total immersion time may be duration. The total immersion time may be at least 15 minutes. The total immersion time may be shorter or longer than this specified period.

In the flowing treatment method, the present formulation is pumped and circulated through the metal pipe at a targeted flow rate. The formulation may be circulated through such a flow system, including the pipe for at least one time or more than once. The circulation may be driven by any pump, including but not limited to a gear pump. The pump may be any pump that is capable of circulating a fluid, particularly a liquid.

Any metal tube to be treated may be fitted in such a system. The system used in the present flowing treatment method may be configured to cater to different diameters of the tube to be treated.

The flow rate used in this flowing treatment method may depend on the system setup or any flow rate required for treating the metal substrate/tube/pipe such that the above advantages are attained.

The volume of formulation that used in this flowing treatment method may be at least 1 ml per cm length of the tube, 5 ml per cm length of tube, 10 ml per cm length of tube or any volume to length ratio falling within this range. A possible ratio would be 6 ml per cm length of tube.

The system may require purging of any duration. Purging the system may prevent the system from suffering an overload. The purged formulation may be recycled or regenerated for reuse. The purging duration may represent the circulation time.

During circulation, a large amount of heat and gas may be evolved since this is a continuous system. This significant amount of heat may reach a temperature of at least 100° C. This heat and/or gas may be evolved within any cycle. When the formulation completes circulating through the system for the first instance, it is taken as 1 cycle. This circulation may be repeated for any number of times.

The pressure in such a system may be 101,325 Pa to 506,625 Pa (1 to 5 atm) or any pressure falling within this range. Advantageously, both methods do not require high pressure to treat the metal substrate.

Further, there is a metal pipe treated with the present formulation based on the method as defined above. This metal pipe may be a stainless steel pipe having an industrial grade known to a skilled person. This metal pipe, having been treated with the present formulation via the present method, possesses the abovementioned advantages.

Using the present formulation and method, any metal pipes may be treated accordingly to obtain the above advantages. A metal pipe treated with the present formulation tends to have lesser carbon-based deposits compared to one that is not treated with the present formulation. The treated metal pipe tends to have variations in the topography of the metal pipe surface (at least at a microscopic level) as a result of the contact with the present formulation and hence is likely to possess the above advantages. On the other hand, a metal pipe not treated with the present formulation does not possess the modified topographical changes and is likely to suffer from higher amounts of carbon-based deposits.

BRIEF DESCRIPTION OF DRAWINGS

The accompanying drawings illustrate the disclosed embodiments and serve to explain the principles of the disclosed embodiments. It is to be understood, however, that the drawings are designed for purposes of illustration only, and not as a definition of the limits of the present disclosure.

FIG. 1

[FIG. 1a] is a schematic drawing showing the carbon-based deposits accumulating in the conduit of a pipe or tube.

[FIG. 1b] is a photograph showing internal deposits that choke up a process part used in the oil industry such that the process part has to be shut down for unscheduled maintenance.

FIG. 2

[FIG. 2a] shows a flow chart depicting the present method for making the present formulation.

[FIG. 2b] shows how a surface defect on a metal substrate causes or encourages carbon-based deposits accumulation.

[FIG. 2c] shows another mechanism by which carbon-based deposits can build up on the surface of a metal substrate.

[FIG. 2d] is an SEM image at a magnification of ×500 showing the carbon-based deposits built-up on a spent pipe.

FIG. 3

[FIG. 3a] shows the experimental setup for treating a targeted pipeline.

[FIG. 3b] compares an original and treated surface of a metal substrate

FIG. 4

[FIG. 4] illustrates the generation of turbulent heat flux due to ditch-like pattern (see accompanying scanning electron microscope (SEM)) on the polished interior surface of a SS321 tube.

FIG. 5

[FIG. 5] shows a process flow summary of the present formulation treatment (chemical polishing) protocol.

FIG. 6

[FIG. 6] shows the general experimental setup for an oil encapsulation test.

FIG. 7

[FIG. 7a] is a schematic diagram showing the possible formation of stable 5- or 6-member ring with iron species.

[FIG. 7b] shows a possible formation of a cap-structure with the surface iron species.

FIG. 8

[FIG. 8a] is a SEM image at a magnification of ×2,200 showing the interior surface of an untreated SS321 tube.

[FIG. 8b] is a SEM image at a magnification of ×2,000 showing the polished surface of a SS321 tube using LHC treated for 30 minutes at 25° C.

[FIG. 8c] is a SEM image at a magnification of ×2,200 showing the polished surface of a SS321 tube using LHC and etidronic acid treated for 30 minutes at 25° C.

[FIG. 8d] is a SEM image at a magnification of ×2,200 showing the polished surface of a SS321 tube using LHC and NDSA treated for 30 minutes at 25° C.

FIG. 9

[FIG. 9a] is a SEM image at a magnification of ×2,200 showing the treated SS321 surfaces using SVA solution.

[FIG. 9b] is a SEM image at a magnification of ×2,200 showing the treated SSS321 surfaces using SHP solution.

FIG. 10

[FIG. 10a] is a photograph showing the degradation of aerospace lubricant with extended heating.

[FIG. 10b] is an optical microscopic image of the used oil (at a scale of 100 um).

[FIG. 10c] is an optical microscopic image of the heated oil from a polished tube (at a scale of 100 um).

[FIG. 10d] is an optical microscopic image of the heated oil from the crude tube (at a scale of 100 um).

FIG. 11

[FIG. 11a] is a SEM image at a magnification of ×2,200 showing a crude surface exposed to oil for 60 hours at 300° C.

[FIG. 11b] is a SEM image at a magnification of ×2,200 showing a LHC-polished surface exposed to oil for 60 hours at 300° C.

[FIG. 11c] is a photograph showing the photos of two sample tubes with the top photo corresponding to that of FIG. 11a and bottom photo corresponding to that of FIG. 11b.

FIG. 12

[FIG. 12a] is a SEM image at a magnification of ×2,200 showing the coking extent on a LHC(etidronic) polished surface.

[FIG. 12b] is a SEM image at a magnification of ×2,200 showing the coking extents on a SHP-polished surface.

FIG. 13

[FIG. 13a] is a SEM image at a magnification of ×2,200 showing the coking extent of the crude untreated SS321 tube after a five cycle heating process.

[FIG. 13b] is a SEM image at a magnification of ×2,200 showing the coking extent of the LHC-polished SS321 tube after a five cycle heating process.

[FIG. 13c] is a photography comparing the coking extent of the crude untreated SS321 tube (left) and the LHC-polished SS321 tube (right) after a five cycle heating process.

FIG. 14

[FIG. 14] is a graph of the Raman spectroscopy for carbon-based deposition on a SS321 pipe.

DETAILED DESCRIPTION OF DRAWINGS

FIG. 1a shows a typical process pipe in which a process fluid is channeled through. In FIG. 1a, oil 100 and 106 is flowed through the conduit of a process pipe. As the oil 100 and 106 flows through, hydrocarbon materials or carbon-based deposits present in the oil 104 may agglomerate and accumulate on the surface of the metal pipe. The formation of the carbon-based deposits may be caused by the heat soak 102 that is produced from residual heat or direct process heating. This heat soak may be at a temperature of 232° C. or 450° F.

FIG. 2a is a flow chart depicting a method for preparation of the present formulation, treating a metal substrate and characterizing the results of this treatment. The first step 200 begins by preparing the present formulation (chemical polishing solution). This solution is prepared by mixing the four components and optionally a stabilizer as described above (also see example 1). Subsequently, this solution is used 201 to treat a pipe (e.g. a metal pipe) by filing and contacting the pipe with the solution in the second step 210. The entire pipe may be immersed in the solution.

In the next step 220, characterization 202 of the treatment is carried out using an oil encapsulation test, a microscopic examination of the topography or morphology of the treated surface of the pipe and an analysis of the used oil sample.

FIG. 2b shows how surface defects 232 of a metal substrate encourage carbon-based deposits to accumulate on the surface 230. Surface defects 232 are the sites where carbon-based deposits can get trapped. As the initial carbon-based particles get trapped at these surface defects 232, the carbon-based deposits at these sites agglomerate and grow 234. Gradually, the agglomerates turns into a coke clog 236 and the coke clog continues to further grow 238 due to severe eddy flow which carries more carbon-based particles that are susceptible to being trapped by the grown clogs 236. FIG. 2d shows how the coke developed on a surface due to defects in a spent pipe. The broken arrow shows an area of heavy coke build up.

FIG. 2c shows another mechanism by which carbon-based deposits can form on the surface of a metal substrate. An oil molecule 520 present in a hydrocarbon fluid flowing through the conduit of a pipe in close proximity to the surface of a metal pipe 500 is shown. As more oil flows along 502 under heating, the oil molecule becomes cross-linked with other oil molecules 522. As the process continues 504 under extended heating, the cross-linked oil molecules grow into a coke embryo 524. As more of such coke embryos form 506, they flocculate together 526. The flocculated coke embryos 526 then coalesced together 528 in step 508. The coalesced coke embryos 528 then settle and deposit on the surface of the untreated metal pipe via sedimentation 510.

In FIG. 3a, an experimental setup of how the internal surface of a targeted pipeline can be treated is shown. The prepared formulation is fed through the inlet pipe into a buffer tank 4 containing the formulation (chemical polishing solution). This buffer tank 4 serves as a feed tank to downstream units and also for temporary storage purpose just in case of an over-feed. When the pipeline to be treated is positioned within the ultrasonification chamber chamber, the liquid pump 3 is switched on to channel the formulation into the pipeline. Between the liquid pump 3 and the ultrasonification chamber, a flow meter 2 and a flow control valve 1 is installed to regulate and monitor the fluid flow. Together, these devices may be use to control the contact time between the formulation and the pipeline. The formulation is then passed out of pipeline into a spent solution tank 5 which collects the used formulation for possible recycling or regeneration. A flow control valve (not shown) can be fitted between the outlet of the pipeline and the spent solution tank for the same purpose as mentioned above.

FIG. 3b generally illustrates how an original rough surface 310 of a metal substrate is modified 300 to have a new topography 320 after being treated with the present formulation (also called chemical polishing). The original rough surface 310 can be attributed to the original production methods of the pipe or tube, such as cold drawing.

FIG. 4 illustrates how the turbulent heat flux 410 is generated due the ditch-like pattern on the polished interior surface of a treated SS321 tube 400 that is exposed to a heat source 420. The accompanying SEM image shows the ditch-like pattern on the surface of the treated SS321 tube.

A summary of the formulation treatment (chemical polishing protocol) is shown in FIG. 5. Firstly, a SS321 tube is weighed and cleansed by rinsing with acetone in step 400. This ensures that the formulation is contacted with the surface of the tube rather than any unwanted debris that may be present on the surface. The tube is then further rinsed 402 with water and dried completely in step 410. The cleansed tube is soaked and contacted 404 with the present formulation (polished using the present formulation) at room temperature in step 420. After treatment 406, the tube is then rinsed and dried in step 430. The tube is then weighed and a weight loss of less than 8.5% is measured.

An oil encapsulation test is shown in FIG. 6. The oil is encapsulated in a SS321 stainless steel tube 600 and metal nuts 602 are used to seal both ends of the tube. The sealed tube 600, 602 is left in a furnace 610 to be exposed to a heat soak of about 300° C. The adjacent figures show the dissected tube for visual examination and the sealed tube for the present oil encapsulation testing. This testing is used to simulate the real situation where degradation of lubricant oil and coking happens during industrial processes. After being heated for a length of time, the metal tube is being dissected for visual examination and further analysis.

EXAMPLES

Non-limiting examples of the present disclosure and comparative examples will be further described in greater detail by reference to specific Examples, which should not be construed as in any way limiting the scope of the present disclosure.

Example 1—Preparation of the Formulation and Treatment Protocol

In oil industry, internal coke deposits in tubes are a common problem as they restrict flow to the extent where processes shut down. This is illustrated in FIG. 1a and FIG. 1b.

FIG. 2a shows the general flow chart describing the steps of the disclosed method and starts with the formulation of the chemical solution, followed by carrying out chemical polishing (CP). This is done by filling the pipe (or tube) with the formulation and the method finishes off by characterizing the treated pipe via an oil encapsulation test, a microscopic examination and an analysis of the used oil samples. This has been described above under detailed description of FIG. 6.

FIG. 3a provides a schematic drawing of the experimental setup. The experimental setup contains the inlet for the chemical polishing solution, a flow control valve, a flow meter, a liquid pump, the pipeline being treated with the chemical polishing solution and a vessel for the outlet.

The present disclosure shows the unexpected discovery of a modified microstructured surface obtained by the present formulation and method. It displays distinct coke-resistant capability by stimulating an eddy flow field over the interior surface because the turbulence facilitates agitation and hence reduces adsorption to the surface as well as thermal stress on the decomposition of oil molecules. The eddy fluid field is presumably induced by the turbulent heat flux that is formed when coming through such an intricate interior surface (FIG. 4). The coke-resistant effect was demonstrated by heating the selected aerospace lubricant oil encapsulated in the SS321 tube for a designed length of time. In short, this is simple and easily scalable and hence could be employed in many industries.

FIG. 5 illustrates an outline of the chemical polishing protocol, using an example a SS321 tube. Starting with a cleaning step using acetone, the tube is then rinsed with water and dried completely. The tube is then soaked in the chemical polishing solution comprising a mineral acid, an oxidant, a sequestering agent, a chelating agent and an optional stabilizer at room temperature. The weight loss after this cleaning step is less than 8.5%. The composition of the sample SS321 tube is described below in table 1b. The tube contains an alloy of carbon, manganese, phosphorous, sulphur, silicon, chromium, nickel, molybdenum, copper, nitrogen and a titanium complex. The specific values can be found according to the ASTM specification.

FIG. 6 shows a schematic drawing of an oil encapsulation test. The sample tube encases the oil and is sealed on both ends with a metal nut. It is being brought into a furnace and heated for a certain length of time, afterwards the metal tube is sectioned for examination.

Preparation of the Formulation (Chemical Polishing Solution)

The formulation (chemical polishing solution) used in the present disclosure invention is water based. The components consist of an oxidizing agent, an etching agent, an ion-sequestering agent or coordination ligand or/and a stabilizing agent (e.g. 1,5-naphthalene disulfonic acid and 5-aminotetrazole). The oxidizing agent is peroxodisulfuric acid ($H_2S_3O_2SO_3$) or hydrogen peroxide ($H_2O_2$). A mineral acid, such as HCl, $HNO_3$ and $H_2SO_4$, or their combination or a superacid, such as $CF_3SO_3H$ and $HSO_3F$, is employed as an etching reagent. The ion sequestering agent is selected from highly water-soluble organic hydroxycarboxylic acids and amino acids, such as malic acid, gluconic acid, citric acid, tartaric acid, lactic acid, glycine, serine, etc. of which lactic acid is preferred because it gives the most desired anti-coking surface. This is because the chemical polishing itself is a cathodic reaction ($M \rightarrow M^{n+}$), the surface of substrate carries a layer of strongly adsorbed metal ions. Sequestering these metal ions from the surface is required for continuing the reaction. The metal ions adsorbed on the highly reactive surface sites, such as those described by the terrace ledge kink (TLK) model, are more difficult to be removed and hence an appropriate sequestering agent is required. However, with the use of a chelating agent that could form stable 5- or 6-membrane rings with iron species (FIG. 7a), these reactive sites could be protected from being polished and hence the ridges on the polished surface could be better reserved.

Similarly, a stabilizer defined as an amphiphilic compound with a planar shape, such as anionic 1,5-naphthalene disulfonic acid (NDSA) and cationic benzotriazole, was included to integrate with or substitute the chelating agent through the formation of the cap-structure with the surface iron species (FIG. 7b). The cap-structure could render both projecting and concave domains because the amphiphilic nature of the stabilizer favours aggregation on the metal surface. So polishing would be more significant in areas that are less covered by the stabilizer. The typical composition of the chemical polishing formulation for the present application is listed in Table 1a. It may be emphasized that as illustrated in FIGS. 3b and 4, the present formulation does not aim to achieve a smooth surface but rather to develop a microstructure that is capable in prompting turbulent heat flux as the medium between heat source and oil. This is further shown with a schematic drawing in FIG. 3b, wherein a rough surface is left behind by cold work and the new topography is created after chemical polishing.

TABLE 1a

Composition of the lactic-hydrogen peroxide-hydrochloric acid (LHC) chemical formulation (polishing solution)

| Composition | Amount |
| --- | --- |
| Hydrogen peroxide solution (20 wt %) | 3 mL |
| Hydrochloric solution (37 wt %) | 9 mL |
| Lactic acid | 5 mL |
| Etidronic acid* | 0.207 g |
| Stabilizer** | ~0.1-0.2 g |

The '*' next to etidronic acid means that another suitable chelating agent is 1,5-naphthalene disulfonic acid (NDSA) while the '**' means that the any organic compounds that are capable of forming a cap-structure with iron species on the surface of a metal substrate can be used as the stablizer.

The roles of these four different components are explained as follow. The etchant (e.g. hydrochloric acid (HCl)) removes surface rust ($Fe_2O_3$) from a metal or solid substrate. It may also capable of removing the iron component from a metal substrate (e.g. stainless steel surface). These may be illustrated by equations (1) and (2) below.

$$6H^+ + Fe_2O_3 \rightarrow 2Fe^{3+} + 3H_2O \quad (1)$$

$$2Fe + 2H^+ \rightarrow 2Fe^{2+} + H_2 \quad (2)$$

Meanwhile, the role of the oxidizing agent (e.g. hydrogen peroxide) serves to convert ferrous ion ($Fe^{2+}$) to ferric ion ($Fe^{3+}$) (see equation (3) below) since ferric ion has a larger reaction equilibrium constant to combine with a sequestering agent (e.g. lactic acid) compared to ferrous ion. The formation of a ferric ion-lactic acid complex (see equation (4)) may be needed to stabilize iron in the aqueous phase. If not, the ferrous ion may undergo hydrolysis to form $Fe(OH)_2$ precipitate when the concentration of free ferrous ions reaches a sufficient concentration for this to occur. If the precipitates form, the substrate may become coated with the precipitated $Fe(OH)_2$ and the surface may not be treated with the present formulation effectively.

$$2Fe^{2+} + H_2O_2 + 2H^+ \rightarrow 2Fe^{3+} + 2H_2O \quad (3)$$

$$Fe^{3+} + xL \rightarrow [FeL_x]^{3+} \quad (4)$$

where L is lactic acid, acting as sequestering agent and x is about 1.5.

Lastly, the chelating agent (e.g. etidronic acid molecules) functions as an adsorbate by chelating or forming a ligand with the surface Fe atoms at morphologically protruded locations (see equation (5)). This may help to foster the development of the desired microstructure as shown in the figures, thereby restructuring the surface of the metal or solid substrate to attain the above advantages.

$$Fe + E \rightarrow Fe \subset E \quad (5)$$

where E is etidronic acid, acting as chelating agent.

In one particular instance, the respective amounts of these four components may be $H_2O_2$ (3 ml)/HCl (9 ml)/lactic acid (5 ml)/etidronic acid (0.21 g). These amounts may be applicable for treating a 5 cm² surface. Particularly, the dose of the chelating agent (e.g. etidronic acid) may affect the surface topography. For example, an increase in etidronic acid from a dose of 0.21 g (0.78 wt %) to 0.4 g (1.5 wt %) may bring about the highest concentration of ridges and grain edges or highest average surface roughness. This may become counterproductive and heavy coking may occur on the surface on the metal or solid substrate since there is likely to be more protruding surfaces that may lead to the deposition of particulates.

In another instance, if the dose of the etchant (e.g. HCl) is too high, over-polishing or severe etching may occur which may lead to the same deleterious effect. It should be noted that the dose of the oxidizing agent (e.g. $H_2O_2$) may have to follow that of the etchant in order to transform ferrous to ferric ions as explained above. Lastly, the dose of the chelating agent (e.g. lactic acid) may have to be sufficient such that the amount present in the formulation suffices to chelate with the $Fe^{3+}$ ion produced.

Observably, the etidronic acid may exert a significant influence on the formation of the microstructures of the treated surface but lactic acid may not. This phenomenon may be attributed to the different chelating selectivity between these two ligands. Etidronic acid may selectively adsorb on ridges and grain edges via forming chelates with Fe while lactic acid may form chelates with $Fe^{3+}$ in the bulk of solution. Hence, it is possible that the chelating selectivity depends on, for instance, the size and charge between the ligand and the central metal, the Gibbs free energy released from coordination, the pH of the reaction medium and the solubility of the component used. Theoretically, in this particular system, the chelating agent must be able to function in a strong acidic medium with pH less than or equal to zero.

Accordingly, the use of the present formulation to treat a metal substrate is namely a cathodic reaction. An example of the cathodic reaction for a stainless steel alloy when reacted with the present formulation may be shown below.

$$Fe(Cr,Ni) \rightarrow Fe^{2/3+} + Cr^{3+} + Ni^{2+}$$

An example of the chelating complex is shown below. Observably, the chelating agent is a ligand capable of forming a ring structure that encapsulates the metal atom or metal ion. The metal atom or ion in this instance is nickel.

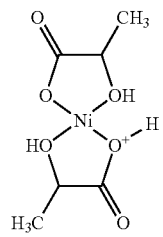

Ligand (Chelating Agent) Complex

Composition of a SS321 Metal Substrate

The composition of a stainless steel grade SS321 pipe is shown in table 1b below.

TABLE 1b

Composition of alloy stainless steel SS321

| Alloy | C | Mn | P | S | Si | Cr | Ni | Mo | Cu | N | Other |
|---|---|---|---|---|---|---|---|---|---|---|---|
| 321 | 0.08 | 2.0 | 0.045 | 0.03 | 0.75 | 17.0 to 19.0 | 9.0-12.0 | 0.75 | 0.75 | 0.1 | Ti = 5 × (C + N) (mini) to 0.7 (max) |

All values indicated are maximum values unless otherwise specified. Values are derived based on AMS and ASTM specifications standard.

Treatment Methods (Flowing Treatment and Immersion Treatment Protocols)

There are two methods which can be used to treat the metal substrate. These two examples do not necessarily limit the present application to these two methods but may include other methods that produce the abovementioned advantages.

The first method (immersion treatment) starts off by soaking a metal substrate in the formulation at a solution/metal surface ratio of approximately 2.1 ml/cm². The immersion was carried out under ambient condition (25° C. and 1 atm). Some heat and gas are released in the first 15 minutes. The temperature of the solution increased to approximately 70 to 80° C. within this period of time and then decreases back to ambient temperature. The total immersion time lasted 1.5 hours.

In the second method (flowing treatment), the setup in FIG. 3a is used. The present formulation is pumped through a metal pipe at a targeted flow rate and the formulation is circulated through this system for a number of times. This can be driven by a gear pump. Taking a SS321 tube (with internal diameter of 4.6 mm), the volume of formulation used is based on 6 ml per cm length of the tube. In this instance, the flow rate is set at 550 ml/min and a total purging time of 30 minutes was needed. A large amount of heat and gas is typically produced in the first 5 cycles and the pressure stays typically over 1 atm but below 5 atm during the treatment.

Oil Thermal Degradation Test

A thermal degradation test was carried out to examine whether there is a formation of carbon-based particles due to prolonged heating instead of solely surface effect. As shown in FIG. 10a, the leftmost vial shows an almost clear oil solution. As the oil is heated for a longer period (from leftmost to rightmost vial), the oil changes to a darker color indicating more carbon-based particles, which can deposit on the surface of a metal substrate, are formed. The aerospace lubricant used in the present is from Honeywell oil.

FIG. 10b shows the optical microscopic image of the used oil sample of the leftmost vial which indicates minor formation of carbon-based deposits. FIG. 10c shows the optical microscopic image of the heated oil that has been contacted with a treated tube. It can be seen that there are some carbon-based deposits in the oil extracted, particularly one agglomerated carbon-based particle. This indicates the particles are not deposited on the tube but remains in the oil.

FIG. 10d is an optical microscopic image of the heated oil from the crude tube. This image shows some carbon-based deposits forming that have not yet agglomerated. This means that most of the agglomerated particles have been deposited on the tube hence leaving behind the smaller particles in the oil extracted.

The heating temperature and period for these tests remained the same throughout for FIG. 10b to FIG. 10d.

Analysis Via Raman Spectroscopy for Evidence of Carbon-Based Deposits on SS321 Tube An analysis was carried out via Raman spectroscopy to determine the amount of carbon-based deposits present on an untreated tube. The analysis was carried out in three ways. One acts as the control which simply uses a pristine SS321 tube where no oil is passed through, another is a stationary oil test in which the oil is simply sealed in the tube and the third is where oil is continuously flowed through the tube to determine if shearing has any effect on the deposition. The Raman spectrum obtained is shown in FIG. 14.

Observably, some carbons were present due to the original composition SS321. It can be observed that continuous flowing oil does help to reduce carbon deposits but the stationary oil left in the tube causes the most carbon-based deposits.

Example 2—Impact of Formulation on the Microstructure of the Internal Surface of a SS321 Tube The SS321 surface, in particular the interior wall of SS321 tube (¼"), has been used as the typical substrate to investigate chemical polishing effect. As observed from the SEM in FIG. 8a, there are numerous structure defects on the internal surface of SS321 tube. They were left from the cold drawing process used to manufacture metal tubes. The surface composition analysis (XPS) revealed that the surface is covered by a thick oxide layer. Contrary to this, the surfaces obtained after polishing using LHC solution (FIG. 8b and FIG. 8c) displayed different microstructures. A dense topography with irregularly oriented domains that assemble as spherulites (labelled by dash circle) and each domain contains a ridge was observed under the SEM. With the use of a chelating agent (e.g. etidronic acid), individual domains are converted to thin stripes assembling in parallel in a spherulite. This microstructure ostensibly has more ridges due to the protection role of the chelating agent as proposed above. On the other hand, with the use of a stabilizer (e.g. NDSA), a dense topography with a mountain-valley contour was developed (FIG. 8d).

As this is a mild polishing system, only less than 10% of the mass of substrate (SS321 tube) is removed over an immersion period ranging from 1 to 4 hours at ambient conditions.

Comparative Example 1

The present formulation serves as improved chemical polishing solution that enhances the coke-resistant capability of a treated surface, particularly a metal surface, by restructuring the surface topography or morphology. The present formulation may render the surface a spherulite contour, in which each grain may exhibit a ladder-like topography on a micron scale when scrutinized using the scanning electron microscopy (SEM).

In addition, the surface composition, primarily the atomic ratio between Fe and Cr of a stainless steel substrate treated with the present formulation, undergoes little change after polishing. This can be determined according to a X-ray photoelectron spectroscopic analysis (XPS).

The technical benefits of the present formulation may be determined through a test of encapsulating an aerospace lubricant (e.g. aerospace grade Mobil Jet Oil II provided by Honeywell) in an enclosed metal tube (e.g. SS321 metal tube) at a temperature 20 to 40° C. above its boiling point (e.g. 300 to 320° C.) for a certain period of time to determine the coking extent. Other temperatures falling outside this range may also be used depending on the fluid used for testing. Through such a test, when the treated and untreated surfaces (crude) are compared, the surface treated with the present formulation manifested almost no deposition of coke particles up to 60 hours. The topographical changes after treating the surface with the present formulation or from chemical polishing using the present formulation can be observed from the internal of the SS321 pipe and such changes may be effective against coke deposition.

In contrast, the crude surface that has not been treated with the present formulation suffers significant coke deposition after a shorter period of 12 hours testing.

The above results can likely be attributed to a surface treated with the present formulation, which undergoes restructuring due to the combined use of the various components that formed the present formulation. The treated or restructured surface becomes capable of stimulating a thin surface eddy fluid field at the testing temperature of 300 to 320° C. This is possibly due to the morphology dependent turbulent heat flux that is likely to be present because of the restructured surface. As temperature increases, the eddy fluidities may increase thereby causing turbulent flow and this helps to reduce surface decomposition of molecules present in a hydrocarbon stream due to the agitation caused by the turbulence.

Comparative Example 2

Two control samples were used as benchmark. They were etched using conventionally existing chemical polishing formulation, SVA and SHP, respectively. Their formulations could be found in Table 2. The polished surfaces by these two polishing solutions display similar microstructures, composed of narrow rectangular stripes but they do not exhibit a clear association pattern in spherulite shape.

TABLE 2

Composition of conventional chemical polishing formulations

| Chemicals | SVA | SHP |
|---|---|---|
| Hydrochloric acid (37%) | 100 ml | 100 mL |
| Nitric acid (65%) | 10 mL | 0 |
| Hydrogen perioxide (20%) | 0 | 15 mL |
| Water | 100 mL | 100 mL |

The modified topographies of the surface of a SS321 tube treated with these conventional formulations are shown in FIG. 9a and FIG. 9b.

In addition to the surface microstructure, the surface roughness is also a crucial parameter characterize the impact of chemical polishing. Table 3 shows the comparison of the three typical surfaces whose surface morphologies are shown in FIGS. 8a, 8b and 9b. As compared to the crude inner surface, the one polished with the LHC solution which was developed herein, offers a lower average roughness though it possesses a higher peak roughness that is attributed to the presence of ridges. On the other hand, the one treated with SHP formulation promotes surface roughness in all aspects.

TABLE 3

Analysis of surface roughness of the selected inner surface of SS321 tube

| Inner surface of the SS321 tube | Average roughness ($R_a$) | Maximum Average Roughness (Max $R_a$) | Root Mean Square Roughness ($R_q$) | Peak Roughness ($R_p$) | Valley Roughness ($R_v$) | Roughness ($R_t$) |
|---|---|---|---|---|---|---|
| Crude | 0.6439 | 0.2379 | 0.8173 | 1.5655 | 2.0570 | 3.6224 |
| Polished by LHC | 0.5235 | 0.3472 | 0.6438 | 1.6982 | 1.1864 | 2.8846 |
| By SHP | 1.4541 | 0.3849 | 1.6176 | 2.3779 | 3.2701 | 5.6479 |

Example 3—Examining the Coking-Resistance of the Different Surfaces

To test the anti-coking capability of the restructured surface by chemical polishing, an oil sample was sealed in the tube and subjected to heating at a designated temperature for a period of time (FIG. 6).

This design simulates the real situation where lubricant circulation in pipes is stagnant and exposed to the heat soak released from the turbine during shut down. The heat soak can reach as high as 450° F. (232° C.) or 300° C. and can last from about 6 to 12 hours. Two typical protocols have been designed as follow.

Example 3a: Batch Test

The testing condition was kept at 300° C. for 60 hours. The oil used in the encapsulation comprises spent oil from the aviation industry and fresh lubricant oil (Mobil Jet Oil II) in the ratio of 1:9. The reason for the inclusion of spent oil was to reinforce the coking condition since the spent oil contains tiny coke and oxide particles that are seeds of larger coke grains and hence cause easier coke deposition. After the test, the tube was cut open and examined by scanning electron microscopy. From FIG. 11a to FIG. 11c, it can be observed that the crude surface is covered by coke and coke granules (FIG. 11a) while the LHC-polished surface remains basically clean (FIG. 11b). The top tube in FIG. 11c shows the crude tube covered with coke. Although the bottom tube in FIG. 11c shows the LHC-polished tube having lesser coking extent, nevertheless, coke is still deposited on the internal treated surface.

In addition, both the LHC (etidronic acid)-polished surface and SHP-polished surface (the control sample) were also tested by using the fresh lubricant as coking medium. After a 56 hours test, the former surface displays tiny coke particles (FIG. 12a), it can be concluded that the addition of chelating agent (etidronic acid) into LHC may enhance the anti-coking capability of the resulting surface. In addition, most of these coke grains were grown on the ridges.

On the contrary, the conventional chemical polishing formulation using only mineral acid and oxidant e.g. SHP solution, could not improve the coke resistance capability. A noticeable extent of coking took place on the SHP-polished surface after the 56 hours oil encapsulation test. Compared with FIG. 9b, the SHP-polished surface is heavily overlaid by coke (FIG. 12b).

Hence, lactic acid is a critical component since it provides metal ion sequestering role in deactivating highly reactive sites, which permits a more uniform etching so as not to entirely remove the grain boundary structure as validated by the surface roughness analysis (Table 3 and FIG. 8b to FIG. 8c).

Example 3b: Thermal Cycling Test

The testing setup was the same as above but the heating pattern was changed. The setup was heated from room temperature to 300° C. at a rate of 9° C./min and this temperature is maintained (dwell) for 12 hours before cooling naturally to ambient temperature.

Such a cycle is repeated after the setup is held at room temperature for 3 hours. Five consecutive cycles were conducted. This test aims to enhance the adsorption of viscous species generated from heat-driven intermolecular condensations of oil molecules on the metal surface during the cooling process in order to assess the anti-coking capability of a surface under conditions that favourably induces coking. Both crude and LHC-polished SS321 tubes were tested. The tubes were examined after five cycles of test, in which the oil sample's cumulative dwell period at 300° C. was 60 hours. The photos of their sectioned segments and the respective electron microscopic images display very different coking extents. A coke layer covered the entire surface of the crude sample as shown in the left tube of FIG. 13c while its accompanying surface SEM image is shown in FIG. 13a. Meanwhile, the polished surface was basically free of coking (see right tube of FIG. 13b and FIG. 13c).

With regards as to whether the combination of a chelating agent (such as an etidronic acid) or a stabilizer (such as NDSA) with the LHC formulation could improve the coking resistance in the oil encapsulation test, a modified cycling test has been carried out by extending each dwelling at 300° C. from the original 12 hours to 56 hours.

In addition, the used oil after each cycle was drained out and fresh oil topped up for the subsequent cycle. This test simulates the oil-change situation during the real maintenance of an aircraft, where despite the longer service interval of more than 56 hours, the difference can be rectified by using a higher heating temperature (e.g. 300° C.) compared to the average temperature used in a real situation.

The amounts of coke deposited in the four specimens through the 3-cycle test were evaluated by the increment of weight percentage, which are summarized in Table 4. Two conclusions can be drawn from this test as follow.

1. It verifies the effectiveness of LHC (FIG. 11b) vs. LHC+ Etidronic acid (FIG. 12a).
2. The formulation of LHC+NDSA shows better performance than LHC alone in terms of reducing coke accumulation by about 36%, attributed to the impact of the mountain-and-valley microstructure as found in FIG. 8d.

TABLE 4

Comparison of the coke deposition in the 4 selected SS321 tubes through a 3-cycle coking test (sample tubes were washed with 2-propanol after the test and then dried. The percentages were obtained from the gravimetric analysis).

|  | Crude | LHC | LHC + NDSA | LHC + Etidronic |
|---|---|---|---|---|
| Accumulative percentage of weight gained after 3 consecutive cycles of oil-encapsulation heating | 0.708% | 0.044% | 0.028% | 0.288% |

SUMMARY OF THE EXAMPLES

The two testing protocols disclosed above are designed to examine the anti-coking capability of the treated (chemically polished) inner surface of a SS321 tube. The composition of the chemical polishing formulation is vital to the anti-coking capability because it achieves two goals.

These goals are the removal of cracks and pits over the internal surface of the SS321 tube and the creation of a microstructure that could bring about turbulent heat flux that leads to a turbulent fluid field over the surface. This surface turbulent fluid motion effectively prevents the adsorption of any coke precursors and reduces the thermal decomposition rate of oil molecules by minimizing local temperature gradients or hotspots.

As shown, an exemplified formulation consisting of lactic acid, hydrogen peroxide, hydrochloric acid and a chelating/stabilizing agent (e.g. NDSA or etidronic acid) offers the distinctly superior anti-coking performance as demonstrated through the crude and control samples when compared to treated samples. The advantages are sustained due to the specific surface microstructure formed by using the present formulation and method. The microstructured surface contains irregularly oriented domains and spherulite contours in which each domain contains ridge. The spherulite contour has been demonstrated to be critical since it aids in producing a spiral fluid field which is a turbulent flow.

The present chemical polishing method, using the present formulation, has been derived to create a specific surface topography on the internal of a SS321 tube for enhancing the anti-coking capability. The resulting treated surface exhibits stronger coking resistance compared to the unpolished counterpart.

The coking resistance was evaluated by heating an aerospace lubricant sealed up in the tube under designated conditions that simulate the soak heat happening in the engine system of aircraft. By treating the internal of the SS321 tube with the present formulation, the topography of the internal wall is modified to become a rather smooth surface. It is reiterated that this microstructure stimulates a surface eddy fluid field that significantly reduces the thermal degradation of the oil and discourages the adsorption of coke particles to the surface due to its agitation effect.

Therefore, the present formulation and method developed is related to the concept of self-curing since no any external intercalation such as coating or addition of coking inhibitor is required.

The present formulation and method are not only cost efficient and scalable but the applicability of the present formulation and method do not suffer from any surface geometry or size limitation. They provide a remedy to the dilemma of coke choking in metal pipes encountered in transport, energy and chemical industries.

INDUSTRIAL APPLICABILITY

The formulation as defined herein is capable of mitigating carbon-based deposits on a metal or solid substrate through the combined use of an oxidizing agent, an etchant, a sequestering agent and a chelating agent. Together, these components are able to modify the topography of the surface of a metal substrate such as the inner surfaces of a metal pipe or tubing. The modified surface is capable of inducing turbulent heat flux and fluid flow which eliminates particulate deposits on a surface. This formulation is not constrained by the duration of any heating as it does not require heat input in order to attain the above effects or advantages. The sole use of corrosive acids for cleaning pipes may be avoided and hence unnecessary damages to a metal pipe may be circumvented.

Advantageously, the present method also provides the above effects and advantages. The present method further protects a solid surface, particularly a metal substrate, from undesired accumulation of carbon-based deposits. This method circumvents the aforementioned limitations.

The present method or formulation may be used to treat a metal substrate such as a pipe in order to attain the abovementioned advantages simply by contacting the formulation with the metal substrate. No application of coating is required.

The present formulation and method is advantageously capable of removing cracks and pits present on the internal surface of a metal pipe or tube. They are capable of creating a microstructure that may bring about turbulent heat flux which in turn leads to turbulent fluid flow over the surface of the metal pipe or metal substrate. This surface turbulent fluid flow effectively prevents the adsorption of carbon-based deposits such as coke and its precursors, thereby reducing the thermal decomposition rate of carbon-based deposits substance (e.g. hydrocarbon molecules) through the minimization of local temperature gradients or hot spots.

When the present formulation and method are used, hazardous gaseous oxidizing agents such as oxygen, ozone, chlorine, nitrogen dioxide, sulfur dioxide or sulfur trioxide may be avoided. Hence, the risk of an explosion when using the gaseous oxidizing agent, for instance oxygen, may be avoided through the use of the present formulation.

The present formulation and method are not only cost efficient and scalable for keeping a metal substrate free of carbon-based deposits but also do not suffer from any constraints imposed by the surface or geometry of the metal substrate or metal pipe to be treated.

Hence, the present formulation and method readily address the problem of pipes or tubes choking encountered in the transport, energy or chemical industries due to the carbon-based deposits. By using the present formulation and method, process downtime can be significantly reduced.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A formulation for inhibiting carbon-based deposits on a metal substrate, the formulation comprising at least one oxidizing agent and at least one etchant to form free metal ions from the metal substrate, at least one sequestering agent having a ligand selected to form a complex with the free metal ions and at least one chelating agent having a ligand selected to complex with at least one surface metal atom, wherein the at least one etchant comprises 50 to 70 wt % of the formulation, based on the weight of the formulation, the at least one etchant being an acid selected from the group consisting of hydrochloric acid, sulfuric acid, nitric acid, trifluoromethanesulfonic acid, fluorosulfuric acid, trichloroacetic acid, trifluoroacetic acid and combination thereof, and wherein the at least one sequestering agent comprises 20 to 25 wt % of the formulation, based on the weight of the formulation.

2. The formulation according to claim 1, wherein the weight ratio of the at least one oxidizing agent to the at least one etchant is 0.2:2 to 0.2:3.

3. The formulation according to claim 1, wherein the weight ratio of the at least one sequestering agent to the at least one chelating agent is 4:0.1 to 5:0.3.

4. The formulation according to claim 1, wherein the at least one oxidizing agent comprises 10 to 15 wt % of the formulation, based on the weight of the formulation.

5. The formulation according to claim 1, wherein the at least one oxidizing agent is selected from the group consisting of peroxides, peroxyacids, peroxyesters, permanganates, mineral acids, nitrates, persulphates, perborates, perchlorates, perchlorites, chlorates, chlorites, percarbonates, derivatives thereof and combinations thereof.

6. The formulation according to claim 1, wherein the at least one sequestering agent is an amino acid selected from the group consisting of glycine, threonine, aspartic acid, glutamic acid and serine.

7. The formulation according to claim 1, wherein the at least one sequestering agent is a hydroxycarboxylic acid selected from the group consisting of malic acid, gluconic acid, citric acid, tartaric acid, glycolic acid and lactic acid.

8. The formulation according to claim 1, wherein the at least one chelating agent comprises 0.5 to 5 wt % of the formulation, based on the weight of the formulation.

9. The formulation according to claim 1, wherein the at least one chelating agent is selected from the group consisting of ketone, phosphonic acid, sulfonic acid and an optionally substituted heterocyclic compound having at least 3 heteroatoms.

10. The formulation according to claim 1, wherein the at least one oxidizing agent comprises 10 to 15 wt % of the formulation, and the at least one chelating agent comprises 0.5 to 1.5 wt % of the formulation, wherein the weight percentages of the etchant, the oxidizing agent, the sequestering agent and the chelating agent add up to 100 wt % of the formulation.

11. The formulation according to claim 1, further comprising a stabilizer, wherein said stabilizer is 1,5-naphthalene disulfonic acid, or a salt thereof.

12. A method for inhibiting carbon-based deposits on a metal substrate, said method comprising:
    contacting said metal substrate with a formulation to inhibit carbon-based deposits on said metal substrate, wherein said formulation comprises at least one oxidizing agent and at least one etchant to form free metal ions from the metal substrate, a sequestering agent having a ligand selected to form a complex with the free metal ions and at least one chelating agent having a ligand selected to complex with at least one surface metal atom,
    wherein the at least one etchant comprises 50 to 70 wt % of the formulation, based on the weight of the formulation, the at least one etchant being an acid selected from the group consisting of hydrochloric acid, sulfuric acid, nitric acid, trifluoromethanesulfonic acid, fluorosulfuric acid, trichloroacetic acid, trifluoroacetic acid and combination thereof, and wherein the at least one sequestering agent comprises 20 to 25 wt % of the formulation, based on the weight of the formulation.

13. The method according to claim 12, wherein the weight ratio of the at least one oxidizing agent to the at least one etchant is 0.2:2 to 0.2:3.

14. The method according to claim 12, wherein the weight ratio of the at least one sequestering agent to the at least one chelating agent is 4:0.1 to 5:0.3.

15. The method according to claim 12, wherein the contacting operation is carried out at a pressure between 101 325 Pa to 506 625 Pa.

16. The metal according to claim 12, wherein the free metal ion is selected from the group consisting of $Fe^{2+}$, $Fe^{3+}$, $Cr^{3+}$, $Ni^+$, $Ti^+$, $Ti^{2+}$, $W^+$ and $W^{2+}$.

17. The method according to claim 12, wherein the at least one surface metal atom is selected from the group consisting of Fe, Cr, Ni, Ti and W.

18. The method according to claim 12, wherein the surface metal atom is a surface metal ion selected from the group consisting of $Fe^{2+}$, $Fe^{3+}$, $Cr^{3+}$, $Ni^+$, $Ti^+$, $Ti^{2+}$, $W^+$ and $W^{2+}$.

19. A metal pipe treated with a formulation for inhibiting carbon-based deposits on a metal substrate, the formulation comprising at least one oxidizing agent and at least one etchant to form free metal ions from the metal substrate, at least one sequestering agent having a ligand selected to form a complex with the free metal ions and at least one chelating agent having a ligand selected to complex with at least one surface metal atom, wherein the at least one etchant comprises 50 to 70 wt % of the formulation, based on the weight of the formulation, the at least one etchant being an acid selected from the group consisting of hydrochloric acid, sulfuric acid, nitric acid, trifluoromethanesulfonic acid, fluorosulfuric acid, trichloroacetic acid, trifluoroacetic acid and combination thereof, and wherein the at least one sequestering agent comprises 20 to 25 wt % of the formulation, based on the weight of the formulation.

* * * * *